US012112911B2

(12) United States Patent
Rosas Salazar et al.

(10) Patent No.: US 12,112,911 B2
(45) Date of Patent: Oct. 8, 2024

(54) ELECTRICAL CONNECTOR ASSEMBLIES

(71) Applicant: Schneider Electric USA, Inc., Boston, MA (US)

(72) Inventors: Cristina Rosas Salazar, Andover, MA (US); Brent W. De Geus, Andover, MA (US); Rodney Powell, Andover, MA (US); Salaheddine Faik, Andover, MA (US); Gary A. Volesky, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/538,955

(22) Filed: Nov. 30, 2021

(65) Prior Publication Data

US 2023/0170161 A1 Jun. 1, 2023

(51) Int. Cl.

*H01R 4/38* (2006.01)
*H01H 9/02* (2006.01)
*H01R 4/42* (2006.01)

(52) U.S. Cl.

CPC ................. *H01H 9/02* (2013.01); *H01R 4/38* (2013.01); *H01R 4/42* (2013.01)

(58) Field of Classification Search

None

See application file for complete search history.

(56) References Cited

U.S. PATENT DOCUMENTS

| | | | | |
|---|---|---|---|---|
| 4,861,278 | A * | 8/1989 | McBride | H01R 4/2416 439/402 |
| 5,249,989 | A * | 10/1993 | Alsch | H01R 4/301 439/813 |
| 5,842,890 | A * | 12/1998 | Gimenez | H01R 4/34 439/813 |
| 6,280,264 | B1 | 8/2001 | Whipple et al. | |
| 7,918,693 | B2 * | 4/2011 | Thomas | F16B 35/005 439/814 |
| 8,011,962 | B2 * | 9/2011 | Pizzi | H01R 4/363 439/607.41 |
| 10,219,416 | B2 * | 2/2019 | Ono | H05K 7/20909 |

FOREIGN PATENT DOCUMENTS

DE 29705555 U1 7/1998

* cited by examiner

*Primary Examiner* — Felix O Figueroa
(74) *Attorney, Agent, or Firm* — Locke Lord LLP

(57) ABSTRACT

An electrical connector assembly can include a housing having a connection opening configured to receive a conductor, and a lug channel in communication with the connection opening. The assembly can also include one or more lug motion resistance features extending from at least one of the housing and the lug. The one or more lug motion resistance features are configured to resist motion of the lug toward the closed position to retain the lug in the open position.

20 Claims, 27 Drawing Sheets

ELECTRICAL CONNECTOR ASSEMBLIES

FIELD

This disclosure relates to electrical connector assemblies (e.g., circuit breakers).

BACKGROUND

In certain electrical connectors (e.g., mini circuit breakers), a lug arrangement may be employed to mechanically clamp a connecting wire to a bus bar. In the open position, the lug can allow a conductor (e.g., a wire or wire bundle) to be inserted into the opening and then moved to the closed position to clamp the conductor to the terminal. The lug may arrive to the customer in the closed position, however. In shipment, lugs tend to move to the closed position due to vibration. Accordingly, the installer frequently must turn the actuator screw to actuate the lug to the open position first to be able to insert the conductor. This added step reduces efficiency and is a time-wasting step.

Such conventional methods and systems have generally been considered satisfactory for their intended purpose. However, there is still a need in the art for improved assemblies. The present disclosure provides a solution for this need.

SUMMARY

An electrical connector assembly can include a housing having a connection opening configured to receive a conductor, and a lug channel in communication with the connection opening. The assembly can also include a terminal extending into the lug channel, and a lug disposed within the lug channel and configured to be actuated between an open position relative to the terminal and the connection opening and a closed position relative to the terminal and the connection opening. The assembly can include an actuator connected to the lug and configured to actuate the lug between the open position and the closed position. The assembly can also include one or more lug motion resistance features extending from at least one of the housing and the lug. The one or more lug motion resistance features are configured to resist motion of the lug toward the closed position to retain the lug in the open position.

In certain embodiments, the one or more lug motion resistance features can be or include one or more protrusions extending from the housing within the lug channel. In certain embodiments, the one or more protrusions can be integral with the housing.

In certain embodiments, the one or more protrusions can be made of a softer material than the lug such that the lug is configured to deform or destroy at least a portion of the one or more protrusions to overcome the one or more protrusions when actuated toward the open position. The one or more protrusions can be configured such that a force required to overcome the one or more protrusions is higher than a force imparted through vibration of the assembly (e.g., due to shaking, dropping, or other force experienced during shipping).

In certain embodiments, the one or more protrusions can include a semi-circular cross-section (e.g., such that the protrusion has a semi-cylindrical shape) or a semispherical shape. Any suitable shape is contemplated herein. In certain embodiments, the one or more protrusions can be sized to fit within a lug opening of the lug after a portion of the lug has moved beyond the one or more protrusions. In certain embodiments, the one or more protrusions can include a breakable component configured to fracture off of a wall defining the lug channel.

In certain embodiments, the one or more protrusions can extend along a complete length of the lug channel in a direction orthogonal to an axis of motion of the lug. In certain embodiments, the one or more protrusions can extend only partly across the lug channel in a direction orthogonal to an axis of motion of the lug. Any suitable dimensions of the one or more protrusions and/or combinations thereof are contemplated herein.

In certain embodiments, the one or more protrusions can include a top protrusion positioned between the lug and an end of the lug channel toward the closed position. In certain embodiments, the one or more protrusions can include a bottom protrusion positioned within a lug opening defined by the lug.

In certain embodiments, the one or more resistance features can include at least two resistance features positioned at opposite sides of the lug channel relative to each other. In certain embodiments, the one or more resistance features can be a single resistance feature.

In certain embodiments, the actuator can be a threaded screw held axially captive between the housing and configured to rotate relative to the housing. The lug can be meshed with the threaded screw to slide axially within the lug channel as a function of rotation of the threaded screw. Any other suitable actuator and arrangement with the lug is contemplated herein.

In accordance with at least one aspect of this disclosure, a housing for a circuit breaker can include a connection opening configured to receive a conductor, a lug channel in communication with the connection opening and configured to receive a lug to allow the lug to move between an open position and a closed position, and one or more protrusions configured to resist motion of the lug toward the closed position to retain the lug in the open position until actuated to overcome the one or more protrusions. The housing can be any suitable housing and include any suitable resistance feature(s) disclosed herein, e.g., as described above.

In accordance with at least one aspect of this disclosure, a circuit breaker can include a housing having a connection opening configured to receive a conductor, and a lug channel in communication with the connection opening. The circuit breaker can include a terminal extending into the lug channel and a lug disposed within the lug channel and configured to be actuated between an open position relative to the terminal and the connection opening and a closed position relative to the terminal and the connection opening. The lug can define a lug opening, and the terminal can be positioned within the lug opening. The circuit breaker can include an actuator connected to the lug and configured to actuate the lug between the open position wherein the conductor is insertable through the connection opening into the lug opening to be between the lug and the terminal, and the closed position wherein the conductor is clamped between the terminal and the lug within the lug opening. The actuator can be a threaded screw held axially captive between the housing and configured to rotate relative to the housing. The lug can be meshed with the threaded screw to slide axially within the lug channel as a function of rotation of the threaded screw. The circuit breaker can include one or more lug motion resistance features extending from at least one of the housing and the lug. The one or more lug motion resistance features can be configured to resist motion of the lug toward the closed position to retain the lug in the open position. The one or more lug motion resistance features can include any suitable resistance features disclosed herein, e.g., described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
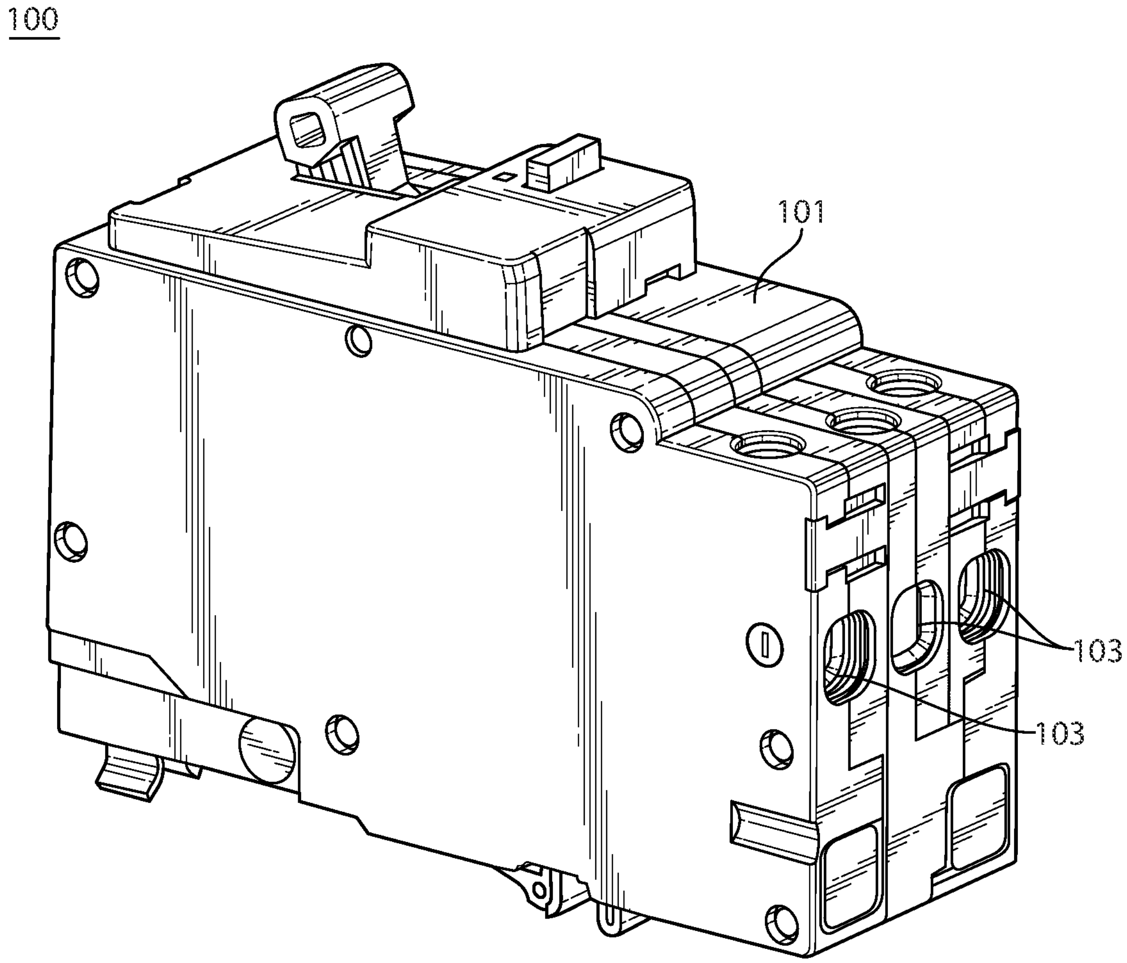
FIG. 1 is a perspective view of an embodiment of an electrical connector assembly in accordance with this disclosure having an embodiment of a housing in accordance with this disclosure.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 2-45.

Figure 2:
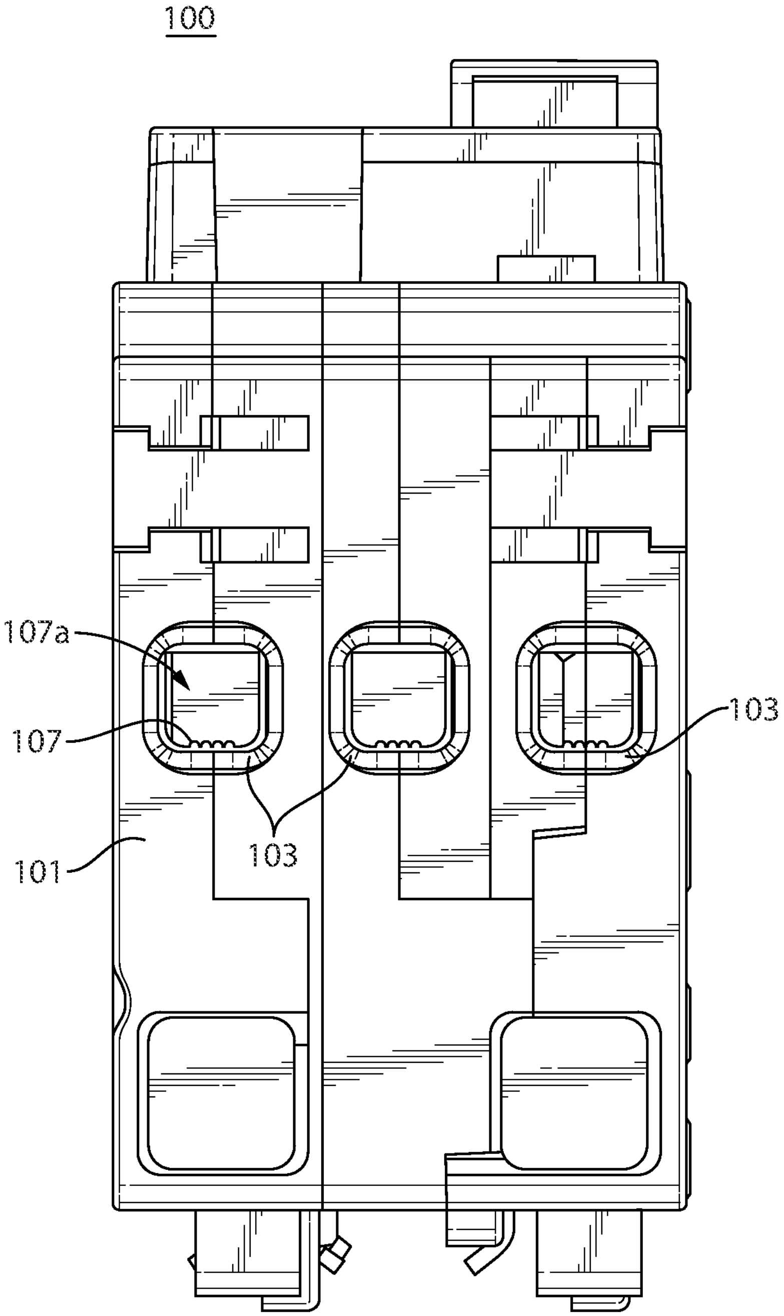
FIG. 2 is an elevation view of the embodiment of FIG. 1, showing a plurality of lugs in an open position.
Figure 3:
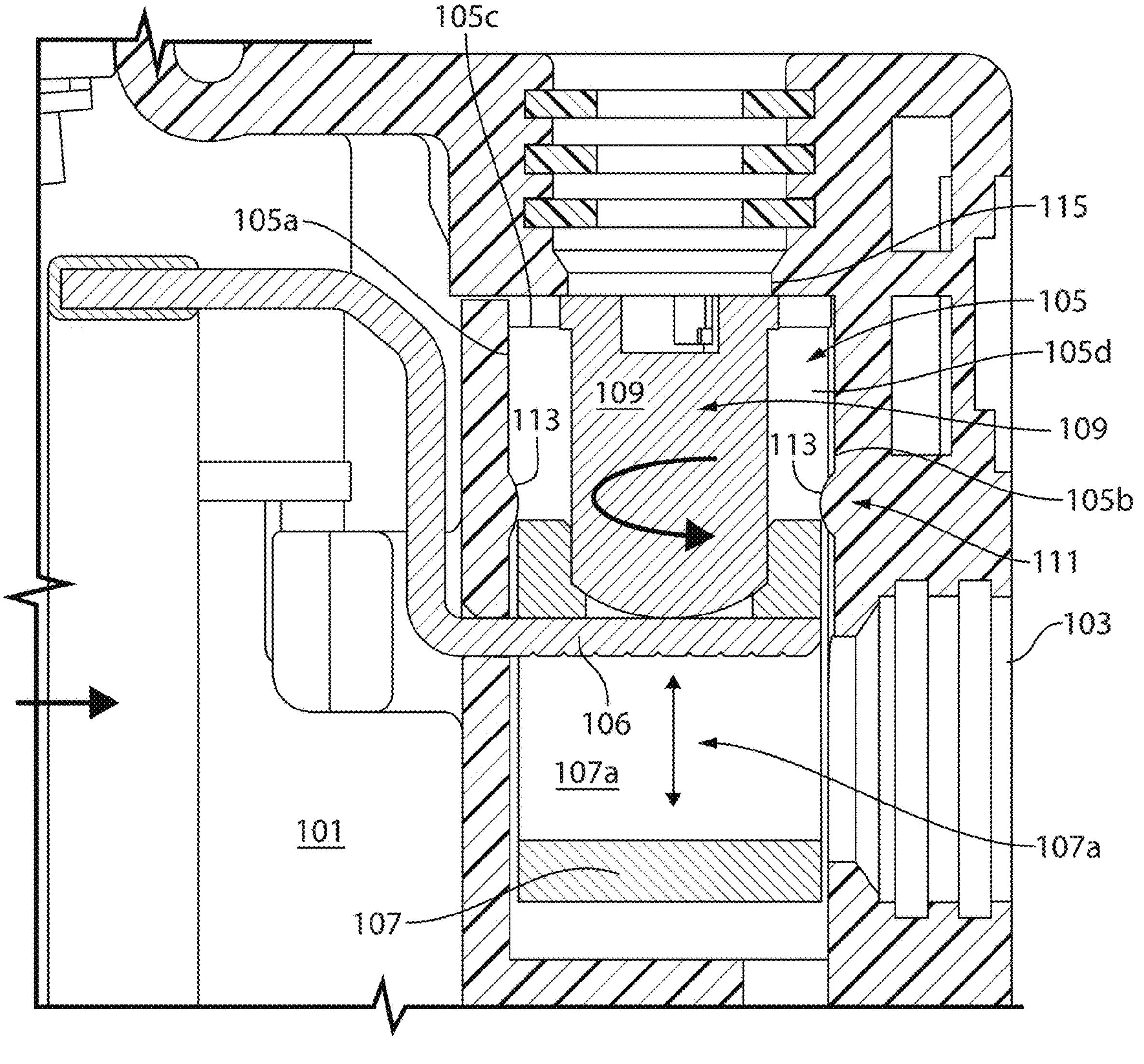
FIG. 3 is a cross-sectional view of the embodiment of FIG. 1, showing a lug in an open position.
Figure 4:
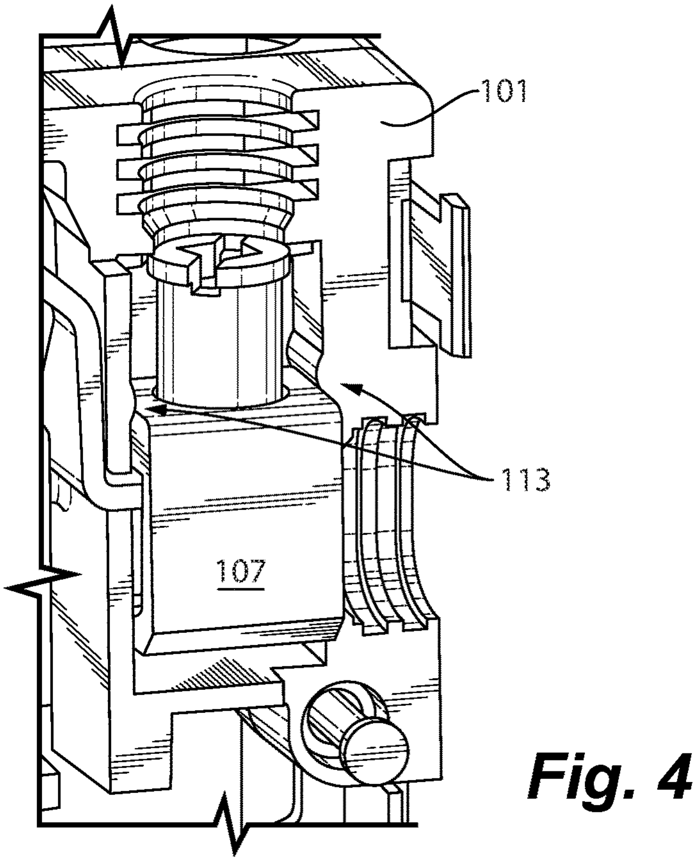
FIG. 4 is a perspective view of the embodiment of FIG. 1, shown having a portion of a housing removed to illustrate an embodiment of a lug disposed within a lug channel in an open position.
Figure 5:
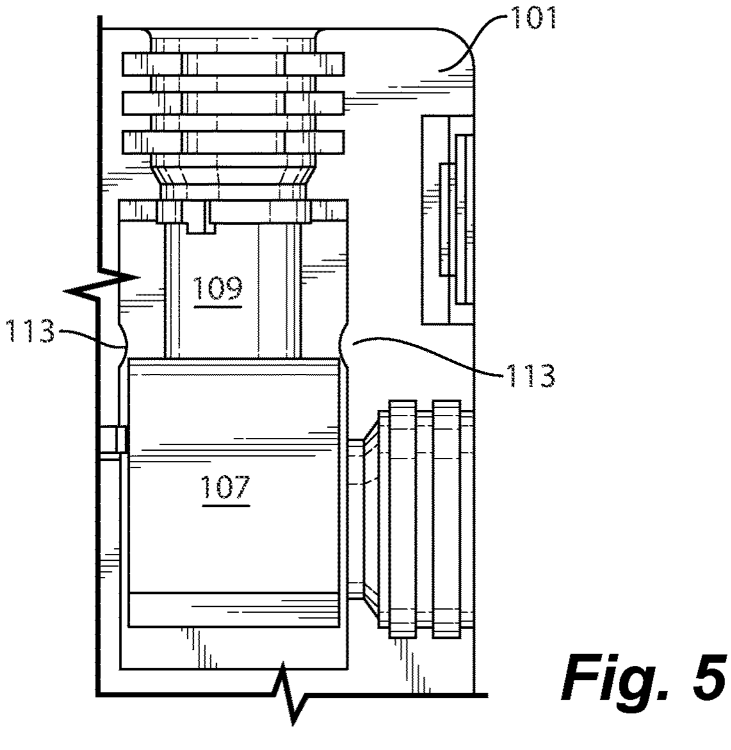
FIG. 5 is an elevation front view of the embodiment as illustrated in FIG. 4, showing a lug in an open position.

Referring to FIGS. 1 and 2, an electrical connector assembly 100 (e.g., a miniature circuit breaker) can include a housing 101 having a connection opening 103 (e.g., a plurality thereof as shown) configured to receive a conductor (e.g., a wire). As shown in FIG. 3, the housing 101 can also include a lug channel 105 in communication with the connection opening 103.

Figure 10:
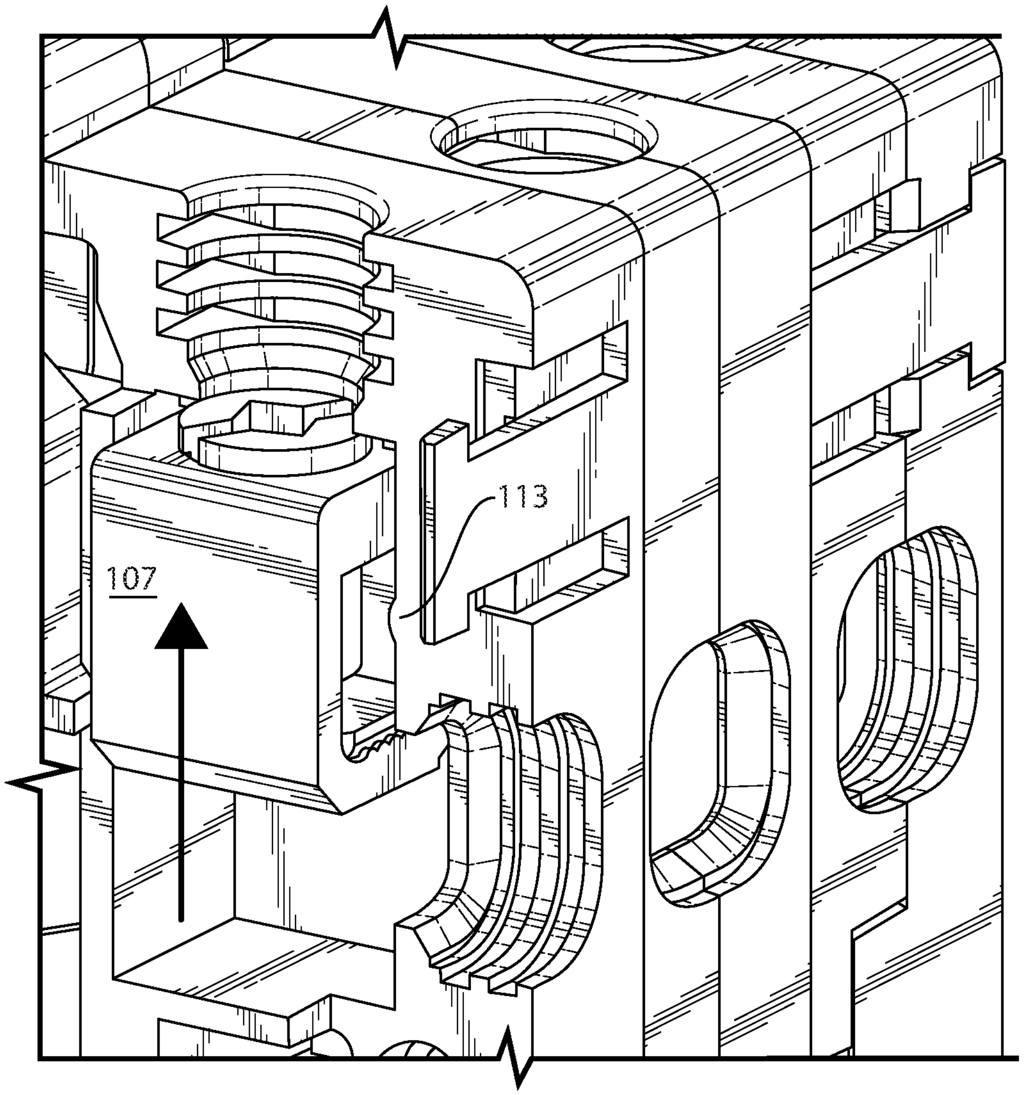
FIG. 10 is a perspective view of the embodiment as shown in FIG. 9, showing a lug in a maximum closed position.
Figure 11:
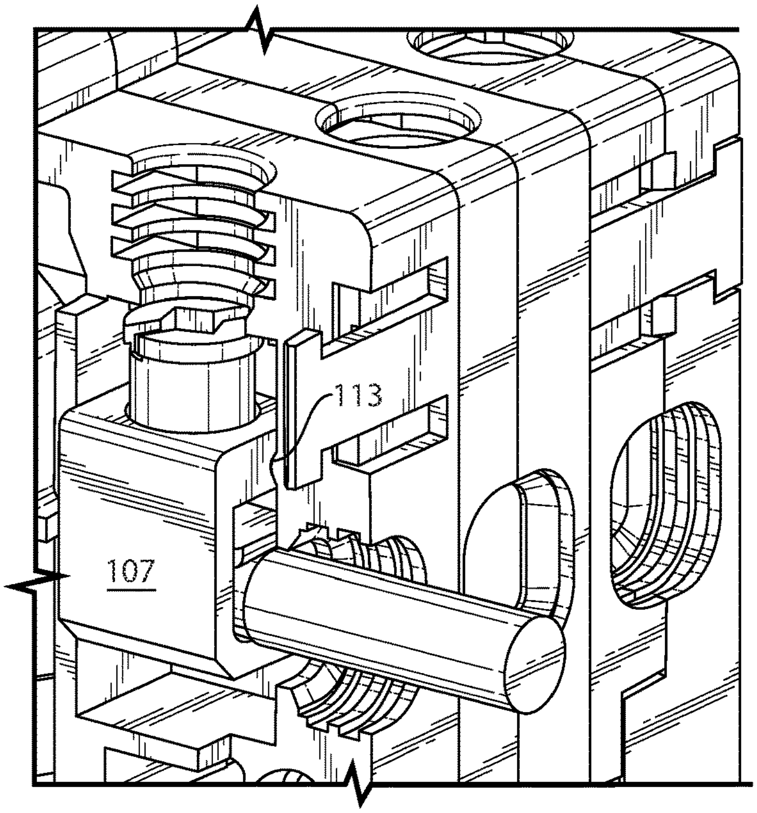
FIG. 11 is a perspective view of the embodiment as shown in FIG. 9, showing a lug in a closed position clamping a conductor.

The assembly 100 can also include a terminal 106 (e.g., a conducting bar) extending into the lug channel 105. The assembly can include a lug 107 disposed within the lug channel 105 and configured to be actuated between an open position (e.g., as shown in FIGS. 3, 4, 5, 8B, and 9) relative to the terminal 106 and the connection opening 103, and a closed position (e.g., as shown in FIG. 10) relative to the terminal 106 and the connection opening 103. The assembly can include an actuator 109 (e.g., a screw) connected to the lug 107 and configured to actuate the lug 107 between the open position and the closed position.

The assembly 100 can also include one or more lug motion resistance features 111 extending from the housing 101 (e.g., into the lug channel 105) and/or the lug 107. The one or more lug motion resistance features 111 can be configured to resist motion of the lug 107 toward the closed position to retain the lug 107 in the open position (e.g., until actuated to overcome the one or more lug motion resistance features 111).

In certain embodiments, the one or more lug motion resistance features 111 can be or include one or more protrusions 113 extending from the housing 101 within the lug channel 105. In certain embodiments, the one or more protrusions 113 can be integral with the housing, e.g., as shown in FIGS. 1-11.

In certain embodiments, the one or more protrusions 113 can be made of a softer material than the lug 107 such that the lug 107 is configured to deform or destroy at least a portion of the one or more protrusions 113 to overcome the one or more protrusions 113 when actuated toward the open position. The one or more protrusions 113 can be configured such that a force required to overcome the one or more protrusions 113 is higher than a force imparted through vibration of the assembly (e.g., due to shaking, dropping, or other force experienced during shipping). For example, the one or more protrusions 113 can be sized and/or shaped such that an amount of force (e.g., torque) applied to the actuator 109 in order to deform, break, or otherwise overcome the one or more protrusions 113 is set to a desired amount (e.g., a fraction of total torque required to clamp a wire to within the lug 107).

Figure 24:
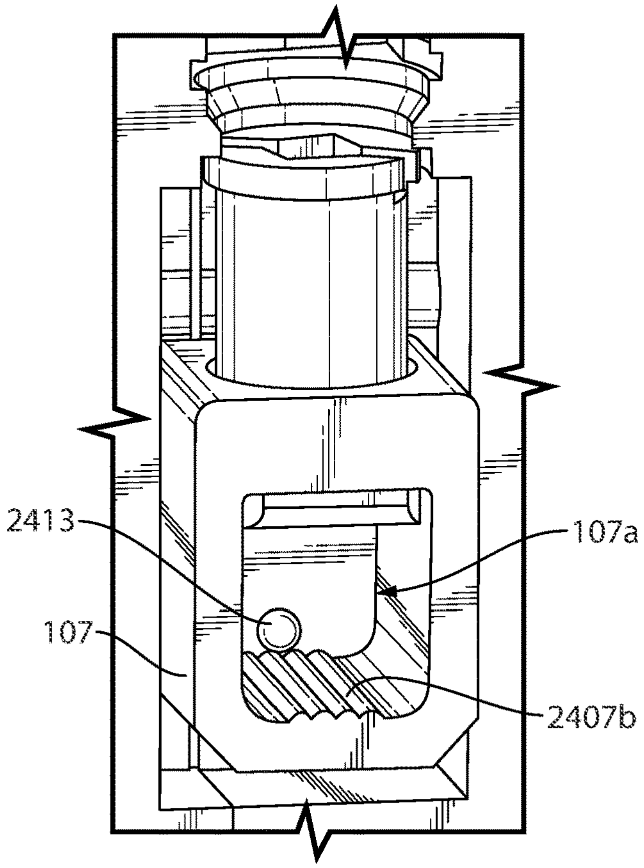
FIG. 24 illustrates a side perspective view of an embodiment of an assembly, wherein the lug motion resistance features include a semispherical protrusion positioned to be within a lug channel of the lug (e.g., to contact a bottom inner surface of the lug in the open position)

In certain embodiments, the one or more protrusions can include a semi-circular cross-section, e.g., as shown in FIGS. 1-11 (e.g., such that a protrusion has a semi-cylindrical shape). In certain embodiments, the one or more protrusions 113 can include a semispherical shape (e.g., protrusion 2413 as shown in FIG. 24). Any suitable shape for the one or more protrusions 113 is contemplated herein.

Figure 6:
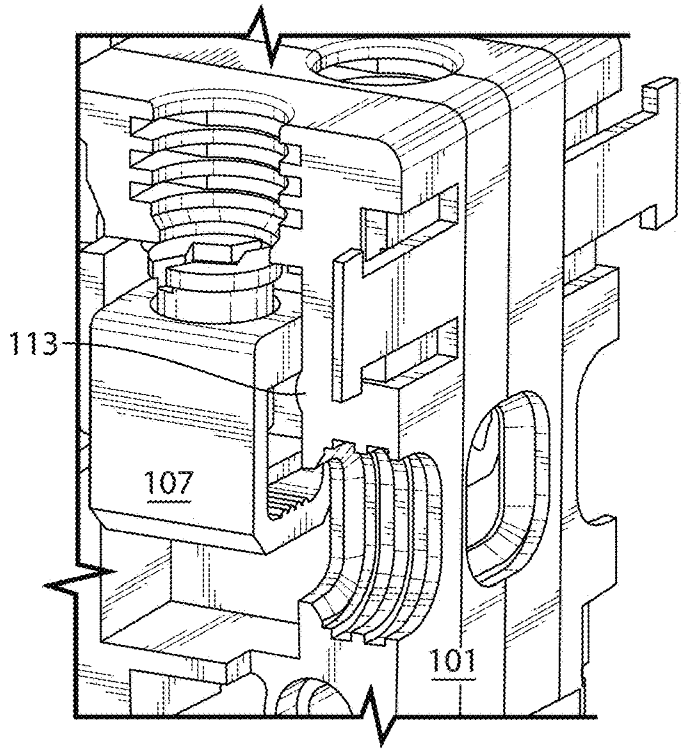
FIG. 6 is another perspective view of the embodiment as illustrated in FIG. 5, showing a lug moved toward a closed position.
Figure 7:
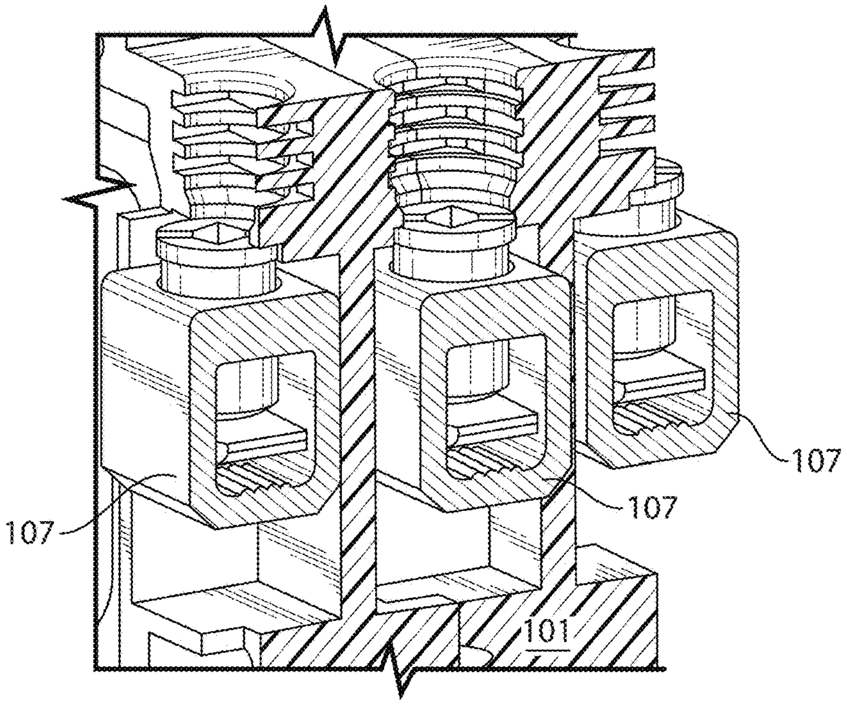
FIG. 7 is a perspective view of the embodiment of FIG. 1, showing the housing in cross-section to show a plurality of lugs moved toward a closed position.
Figure 16:
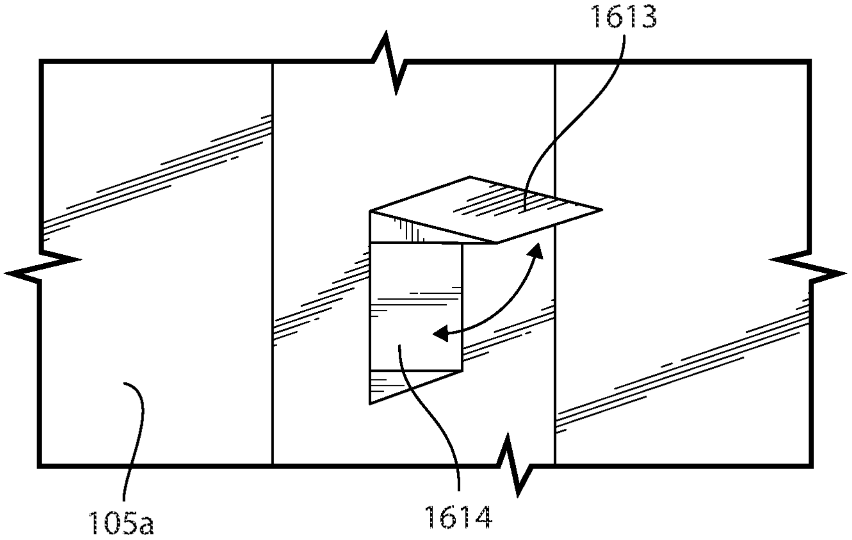
FIG. 16 illustrates a partial perspective view of an embodiment of a lug motion resistance feature comprising a breakable feature (e.g., plastic) stored in a pocket and extending from a housing.
Figure 30:
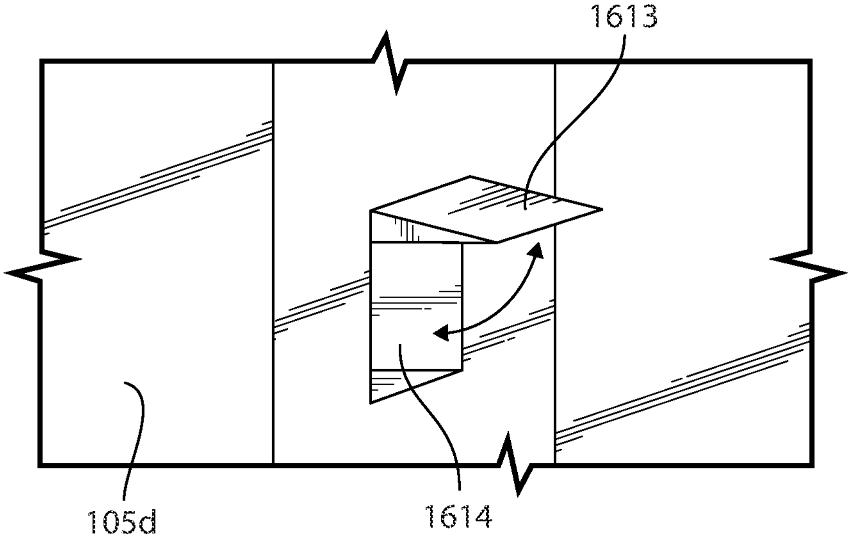
FIG. 30 illustrates a partial perspective view of an embodiment of a lug motion resistance feature comprising a breakable feature stored in a pocket and extending from a housing on an orthogonal side to that shown in FIG. 16.

In certain embodiments, the one or more protrusions 113 can be sized to fit within a lug opening 107*a* of the lug 107 after a portion of the lug 107 has moved beyond the one or more protrusions 113 (e.g., once a top portion of the lug 107 passes above the protrusions 113 as shown in FIG. 6). In certain embodiments, the one or more protrusions 113 can include a breakable component (e.g., a thin protrusion) configured to fracture off of a wall 105*a*, 105*b* defining the lug channel 105. An embodiment of a breakable feature is shown in FIGS. 16 and 30.

Figure 37:
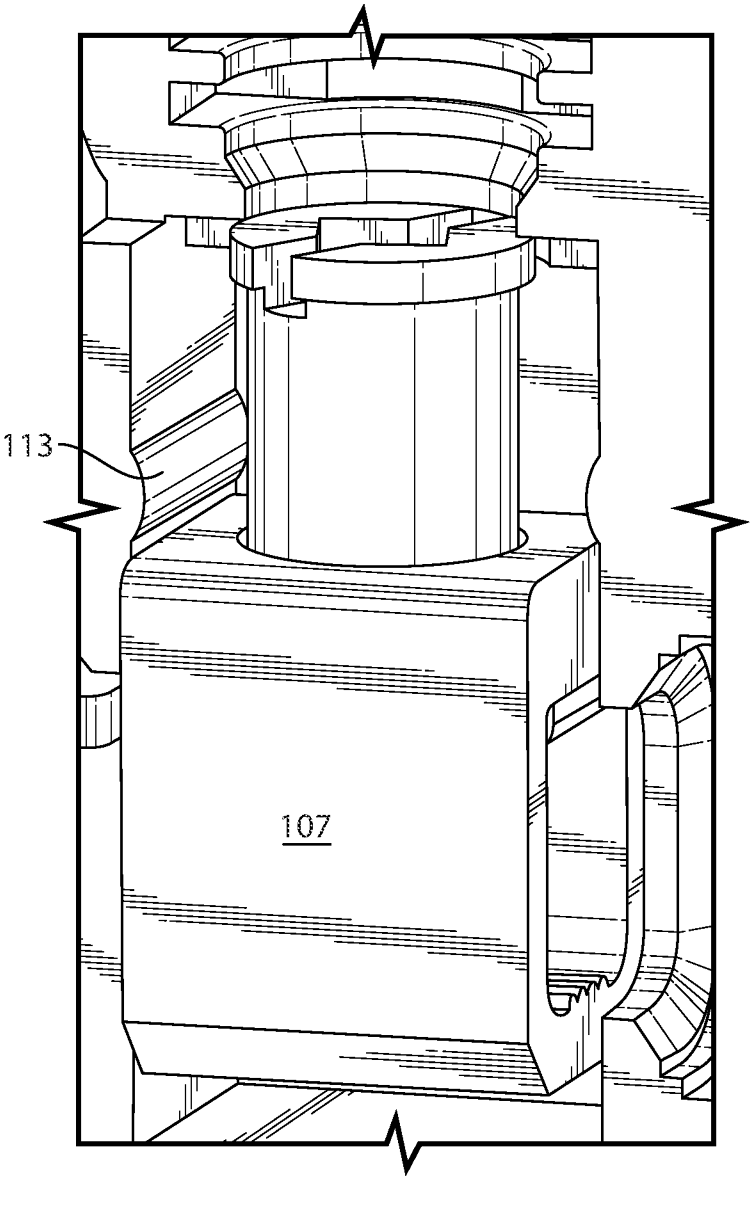
FIG. 37 is a perspective view illustrating an embodiment of a lug motion resistance feature having a full length semi-circular shape extending along an entire length of an inner wall defining a lug channel.

In certain embodiments, the one or more protrusions 113 can extend along a complete length of the lug channel 105 in a direction orthogonal to an axis of motion of the lug 107 (e.g., a direction into and out of the page in FIG. 3, e.g., as shown in FIG. 37). In this regard, some portion of one or more protrusions 113 may always stay in contact with, or be adjacent to, the lug 107 after the lug 107 has overcome the lug 113.

In certain embodiments, the one or more protrusions 113 can extend only partly across the lug channel 105 in a direction orthogonal to an axis of motion of the lug 107 (e.g., as shown in FIGS. 24, 25, 35, and 36). Any suitable dimensions of the one or more protrusions 113 and/or combinations thereof are contemplated herein.

Figure 35:
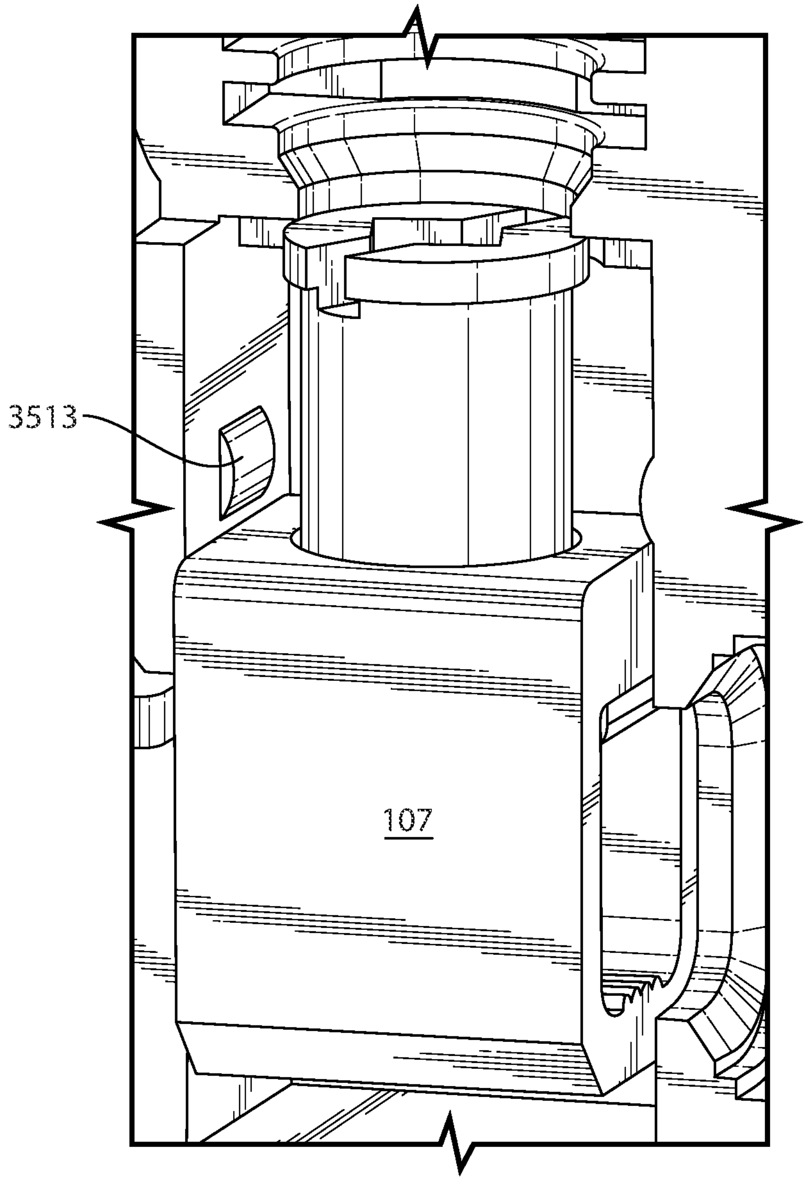
FIG. 35 is a perspective view illustrating an embodiment of a lug motion resistance feature having a partial length semi-circular shape.
Figure 36:
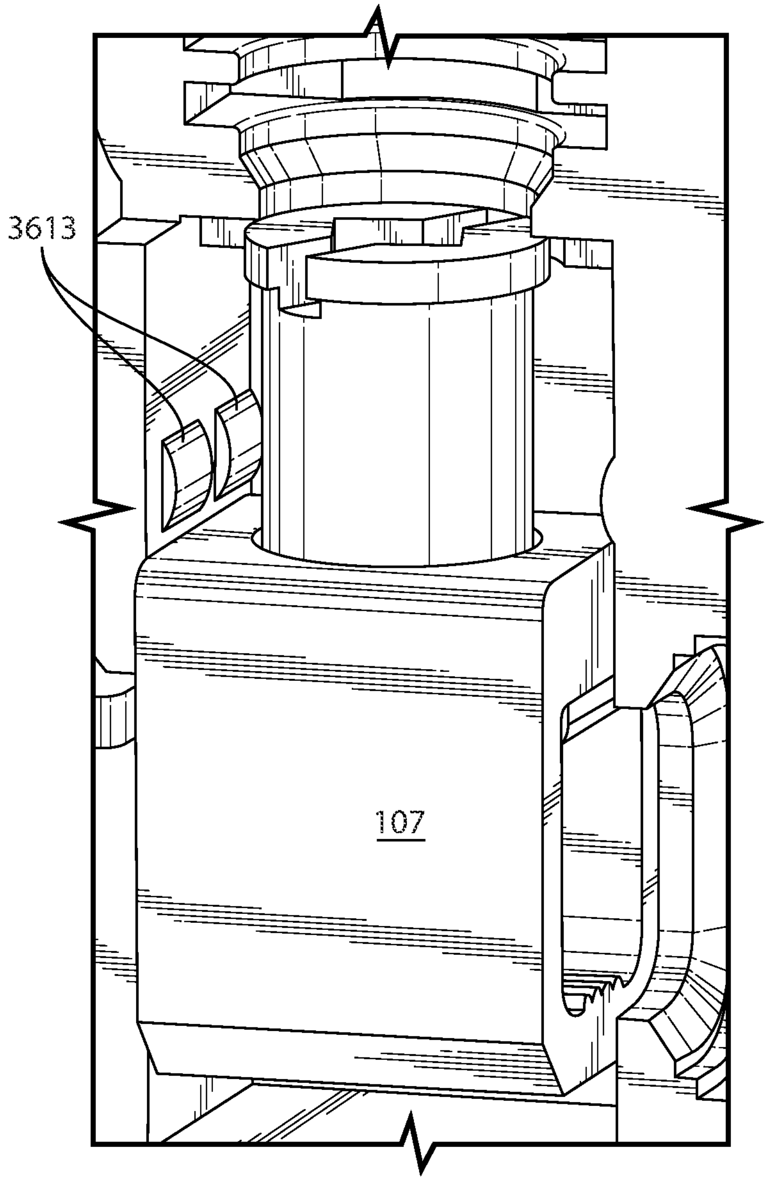
FIG. 36 is a perspective view illustrating an embodiment of a lug motion resistance feature having a plurality of sections of a partial length semi-circular shape.

In certain embodiments, e.g., as shown in the embodiment of FIGS. 1-11, the one or more protrusions 113 can include a top protrusion positioned between the lug 107 and an end 105*c* (e.g., a top in the orientation as shown in FIG. 3) of the lug channel 105 toward the closed position (e.g., upward in the orientation shown in FIG. 3). In certain embodiments, the one or more protrusions 113 can fit within the lug channel 107*a* after the lug 107 moves upwardly sufficiently far. In this regard, once the lug 107 is moved past the top protrusion, (e.g., protrusions 3513 and 3613 as shown in FIGS. 35 and 36), the lug 107 will no longer be in contact with or otherwise affected by the bottom protrusion as the bottom protrusion can be underneath the lug 107.

Figure 25:
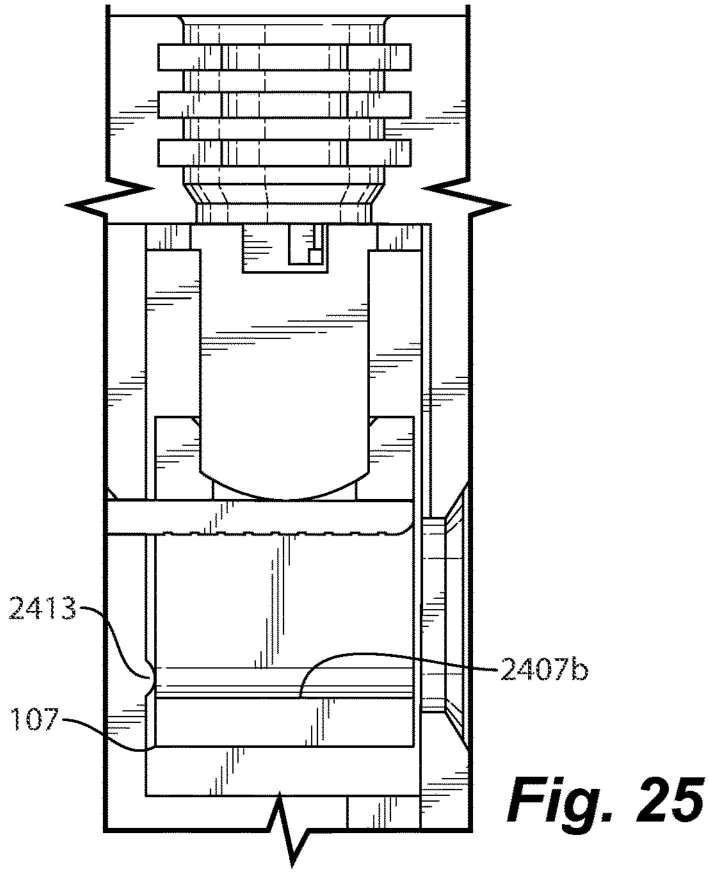
FIG. 25 illustrates a front cross-sectional view of an embodiment of an assembly, wherein the lug motion resistance features include a semispherical protrusion positioned to be within a lug channel of the lug (e.g., to contact a bottom inner surface of the lug in the open position)

In certain embodiments, the one or more protrusions 113 can include a bottom protrusion positioned within a lug opening 107*a* defined by the lug 107 (e.g., protrusion 2413 as shown in FIGS. 24 and 25). In this regard, once the lug 107 is moved past the bottom protrusion (e.g., protrusion 2413 as shown in FIGS. 24 and 25), the lug 107 will no longer be in contact with or otherwise affected by the bottom protrusion as the bottom protrusion can be underneath the lug 107. Additionally, broken or shaved material can fall to the bottom of the lug channel 105. Any other suitable type or position of protrusion is contemplated herein. Any combinations of top embodiments and bottom embodiments, and any number of each, are contemplated herein.

In certain embodiments, as shown in FIGS. 1-11, the one or more resistance features 111 can include at least two resistance 111 features positioned at opposite sides (e.g., on opposite walls 105*a*, 105*b*) of the lug channel 105 relative to each other. Any other suitable embodiments having any suitable plurality of resistance features in any suitable relative locations (e.g., on perpendicular walls), are contemplated herein.

In certain embodiments, the one or more resistance features 111 can be a single resistance feature. Any other suitable embodiments having any suitable single resistance features in any suitable relative locations, are contemplated herein.

In certain embodiments, the actuator 109 can be a threaded screw (e.g., as shown throughout the figures) held axially captive between the housing 101 and configured to rotate relative to the housing 101. For example, the screw can be held between the terminal 106 and a screw access portion 115 defined in the housing 101 (e.g., which defines a tool access hole for the actuator 109). The screw access portion 115 can prevent the screw from moving axially, but allow the actuator 109 to rotate. The lug 107 can be meshed with the threaded screw to slide axially (e.g., up and down in the orientation shown in FIG. 3) within the lug channel 105 as a function of rotation of the threaded screw. In embodiments with the screw being threaded into the lug, this threaded relationship can prevent movement laterally since the lug itself is captivated laterally in the lug channel. The diameter at the bottom of the screw access portion 115 can prevent the screw from moving axially (up and down as shown) due to the screw head being larger diameter than the bottom of the screw access portion. Any other suitable actuator 109 and arrangement with the lug 107 is contemplated herein.

FIGS. 12-45 show various embodiments and features thereof. Various embodiments of top protrusions and/or other resistance features are shown in FIGS. 12-21, 35-37, 39, 41, 43, and 45. Various embodiments having a single resistance feature 111 are shown in FIGS. 17-20, 24, 25, 31-34, 38, 39, 42, and 43. Various embodiments having two or more resistance features 111 are shown in FIGS. 12-15, 21-23, 26-29, 40, 41, 44, and 45. The embodiments of FIGS. 12-45 are further described below.

Figure 12:
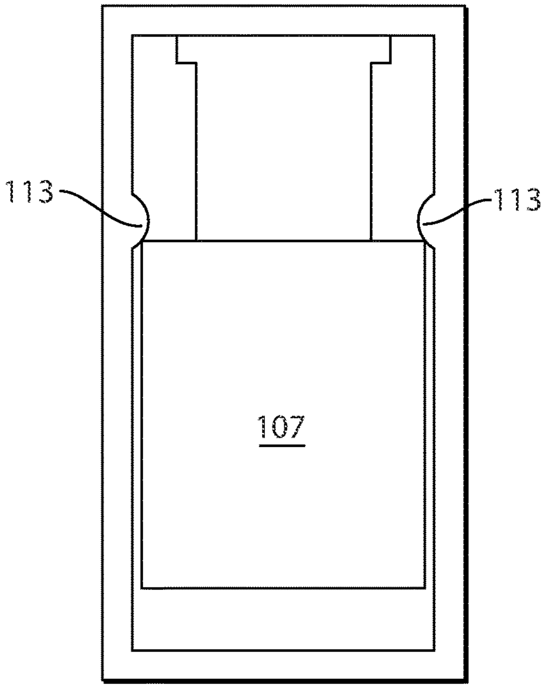
FIG. 12 illustrates a front view schematic diagram of an embodiment of a plurality of lug motion resistance features above a lug, e.g., as shown in FIG. 1.
Figure 13:
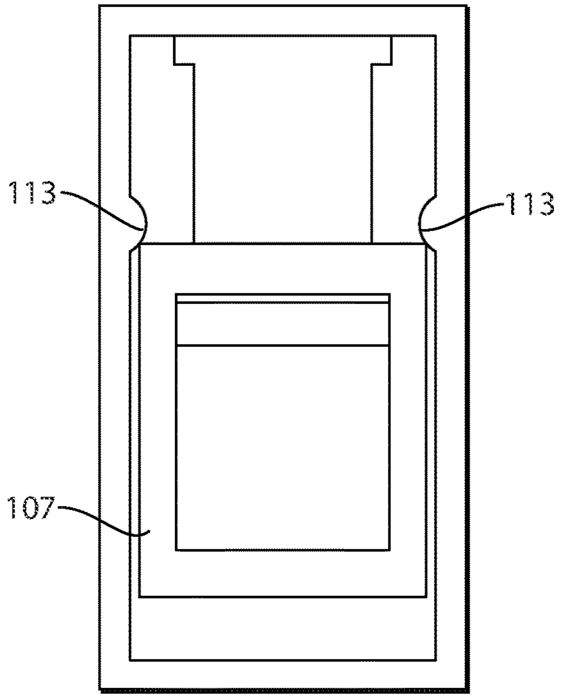
FIG. 13 illustrates a side view schematic diagram (orthogonal to the front view of FIG. 12) of an embodiment of a plurality of lug motion resistance features above a lug.
Figure 14:
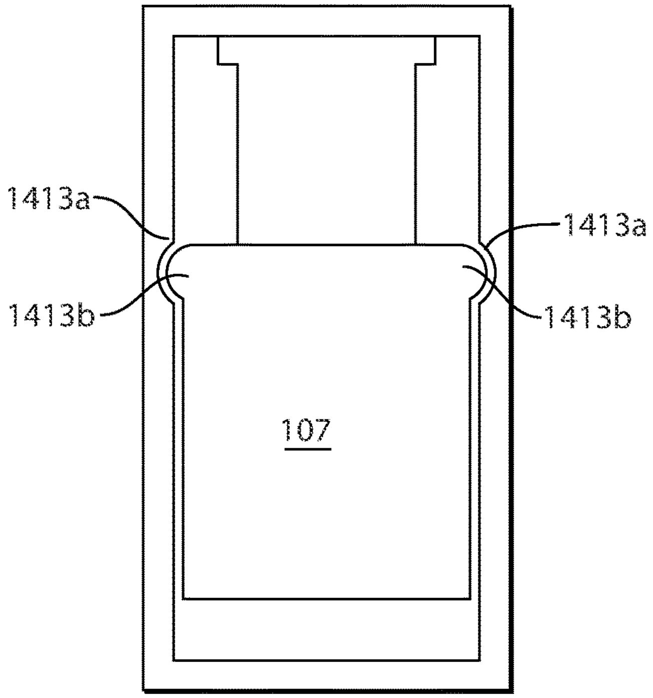
FIG. 14 illustrates a front view schematic diagram of an embodiment of a plurality of lug motion resistance features extending from an upper portion of a lug (e.g., into a recess on the housing)
Figure 15:
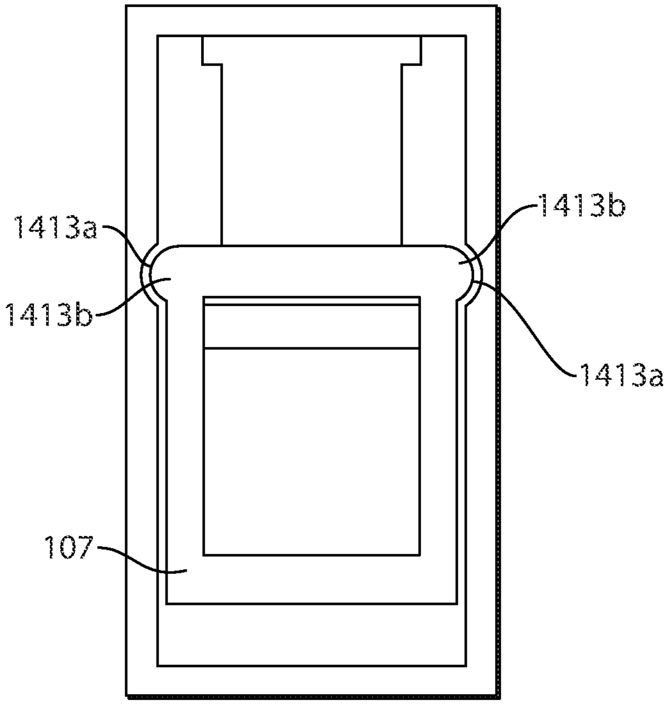
FIG. 15 illustrates a side view schematic diagram of an embodiment of a plurality of lug motion resistance features extending from an upper portion of a lug (e.g., into a recess on the housing)

FIG. 12 illustrates a front view schematic diagram of an embodiment of a plurality of lug motion resistance features (e.g., protrusions 113) above a lug 107, e.g., as shown in FIG. 1. FIG. 13 illustrates a side view schematic diagram (orthogonal to the front view of FIG. 12) of an embodiment of a plurality of lug motion resistance features (e.g., protrusions 113) above a lug 107. FIG. 14 illustrates a front view schematic diagram of an embodiment of a plurality of lug motion resistance features (e.g., protrusion 1413*b*) extending from an upper portion of a lug 107 (e.g., into a recess 1413*a* on the housing 101). FIG. 15 illustrates a side view schematic diagram of an embodiment of a plurality of lug motion resistance features (e.g., protrusions 1413*b*) extending from an upper portion of a lug 107 (e.g., into a recess 1413*a* on the housing 101). FIG. 16 illustrates a partial perspective view of an embodiment of a lug motion resistance feature comprising a breakable feature 1613 (e.g., plastic) stored in a pocket 1614 and extending from a housing 101 (e.g., wall 105*a*).

Figure 17:
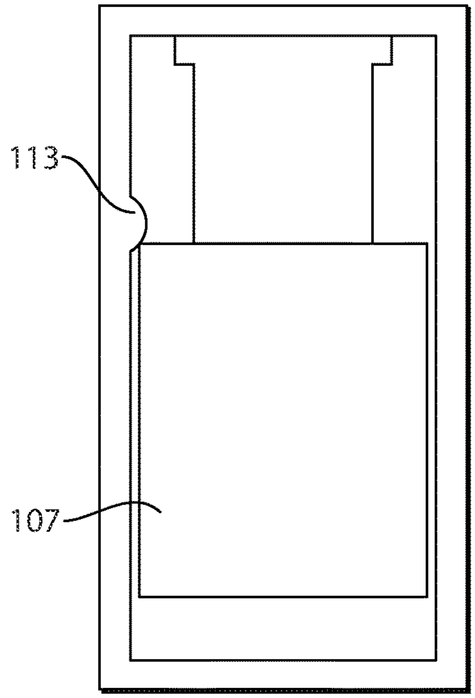
FIG. 17 illustrates a front view schematic diagram of an embodiment of a single lug motion resistance feature above a lug.
Figure 18:
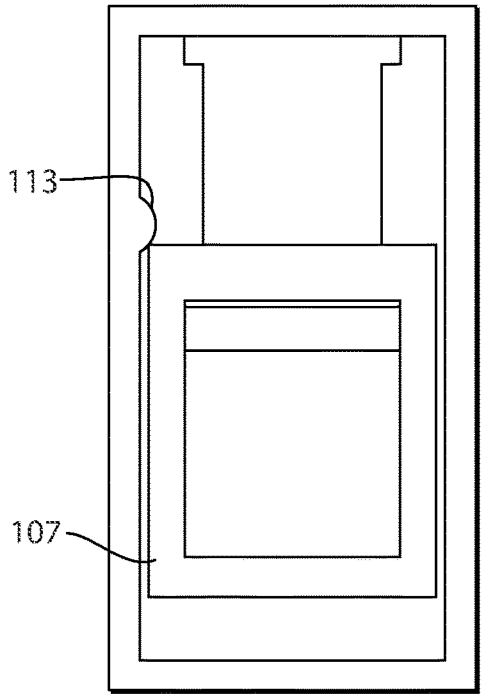
FIG. 18 illustrates a side view schematic diagram of an embodiment of a single lug motion resistance feature above a lug.
Figure 19:
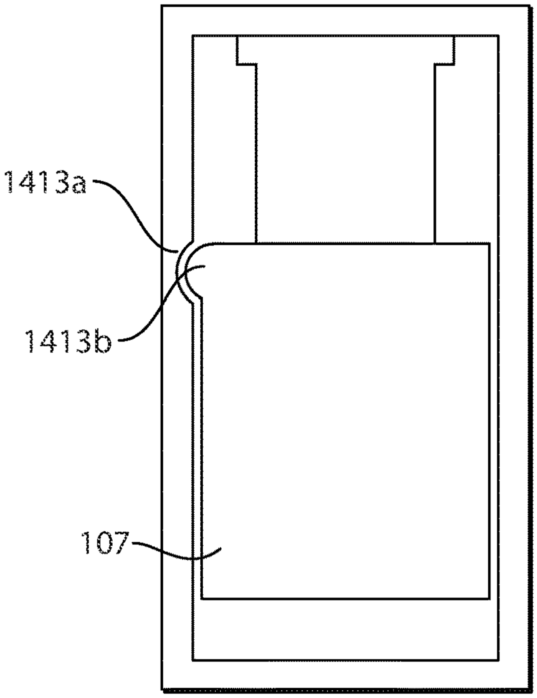
FIG. 19 illustrates a front view schematic diagram of an embodiment of a single lug motion resistance feature extending from an upper portion of a lug (e.g., into a recess on the housing)
Figure 20:
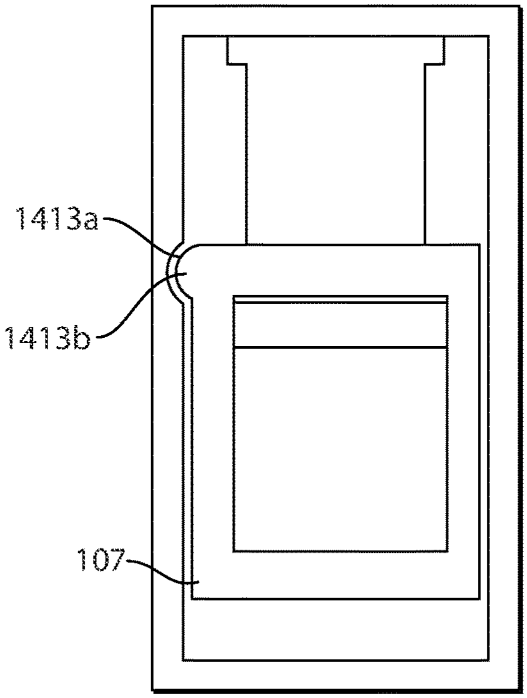
FIG. 20 illustrates a side view schematic diagram of an embodiment of a single lug motion resistance feature extending from an upper portion of a lug (e.g., into a recess on the housing)

FIG. 17 illustrates a front view schematic diagram of an embodiment of a single lug motion resistance feature (e.g., protrusion 113) above a lug 107. FIG. 18 illustrates a side view schematic diagram of an embodiment of a single lug motion resistance feature (e.g., protrusion 113) above a lug 107. FIG. 19 illustrates a front view schematic diagram of an embodiment of a single lug motion resistance feature (e.g., protrusion 1413*b*) extending from an upper portion of a lug (e.g., into a recess 1413*a* on the housing 101). FIG. 20 illustrates a side view schematic diagram of an embodiment of a single lug motion resistance feature (e.g., protrusion 1413*b*) extending from an upper portion of a lug (e.g., into a recess 1413*a* on the housing 101).

Figure 21:
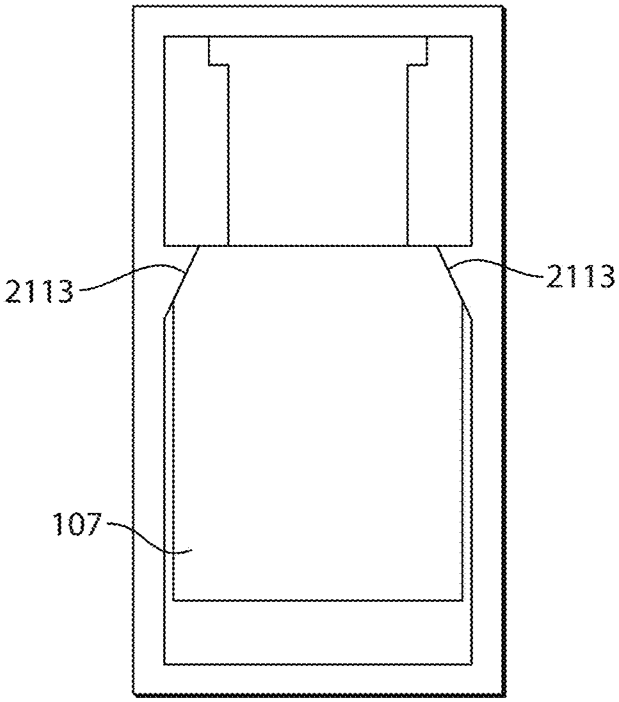
FIG. 21 illustrates a front view schematic diagram of an embodiment of a plurality of lug motion resistance features above a lug, shown having a chamfer or slanted shape.
Figure 22:
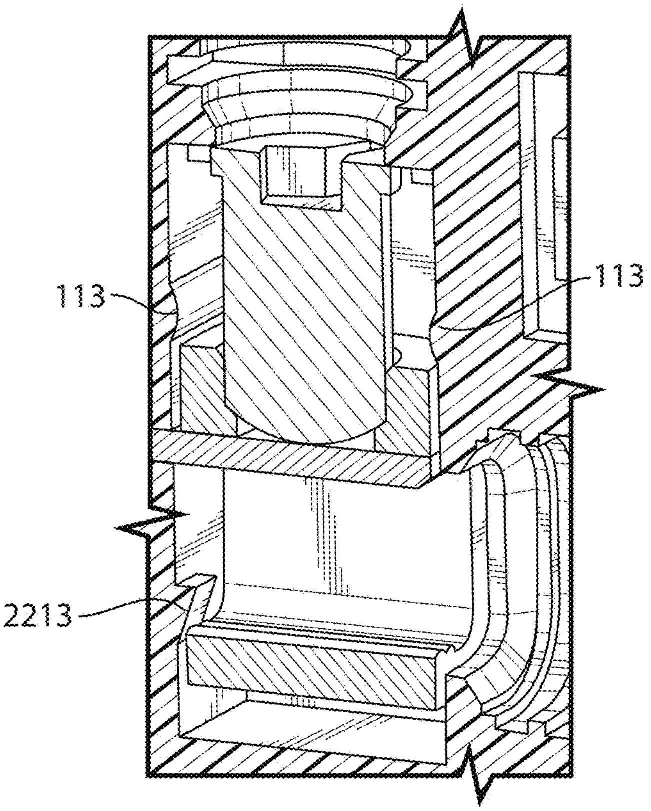
FIG. 22 illustrates a front view schematic diagram of an embodiment of a plurality of lug motion resistance features positioned to be within a lug channel (e.g., to contact a lower inner surface of the lug), shown having a chamfer or slanted shape.

FIG. 21 illustrates a front view schematic diagram of an embodiment of a plurality of lug motion resistance features (e.g., protrusions 2113) above a lug 107, shown having a chamfer or slanted shape. FIG. 22 illustrates a front view schematic diagram of an embodiment of a plurality of lug motion resistance features (e.g., protrusions 113 and/or protrusion 2213) positioned to be within a lug channel 105 (e.g., to contact a lower inner surface of the lug 107), the protrusion 2213 shown having a chamfer or slanted shape. It is contemplated that the lower protrusion 2213 can be utilized without the upper protrusions 113 shown, for example.

Figure 23:
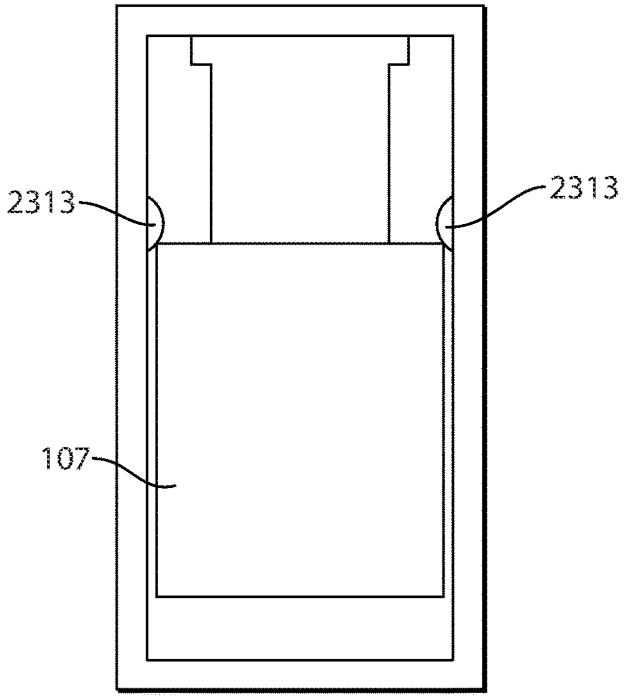
FIG. 23 illustrates a front view schematic diagram of an embodiment of a plurality of lug motion resistance features above a lug, shown having a different material than the housing (e.g., a softer or more compliant material)

FIG. 23 illustrates a front view schematic diagram of an embodiment of a plurality of lug motion resistance features (e.g., protrusions 2313) above a lug 107, shown having a different material than the housing 101 (e.g., a softer or more compliant and/or destructible material). For example, protrusions 2313 can be attached separately or additively manufactured out of a weaker material.

FIG. 24 illustrates a side perspective view of an embodiment of an assembly, where the lug motion resistance features are or include a semispherical protrusion 2413 positioned to be within a lug channel 107*a* of the lug 107 (e.g., to contact a bottom inner surface 2407*b* of the lug in the open position). FIG. 25 illustrates a front cross-sectional view the embodiment of FIG. 24, showing the semispherical protrusion 2413 positioned within the lug channel 107*a* of the lug 107 (e.g., shown contacting a bottom inner surface 2407*b* of the lug 107 in the open position).

Figure 26:
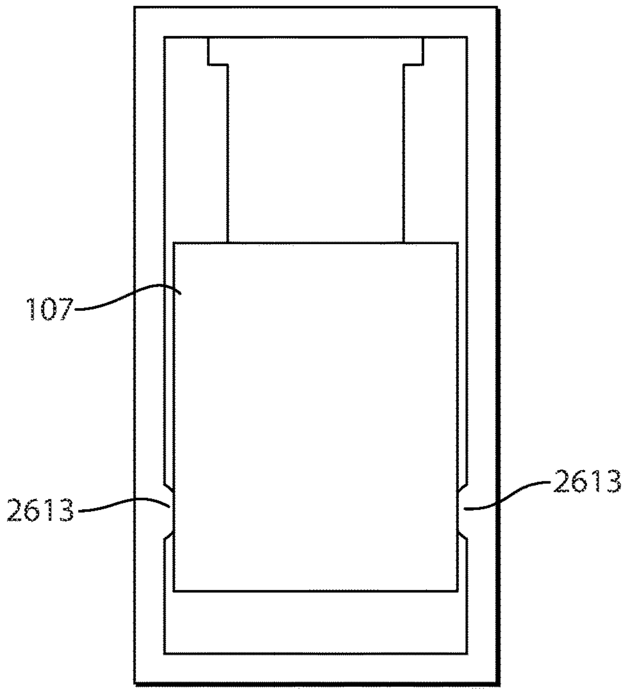
FIG. 26 illustrates a front view schematic diagram of an embodiment of a plurality of lug motion resistance features positioned to be within a lug opening.
Figure 27:
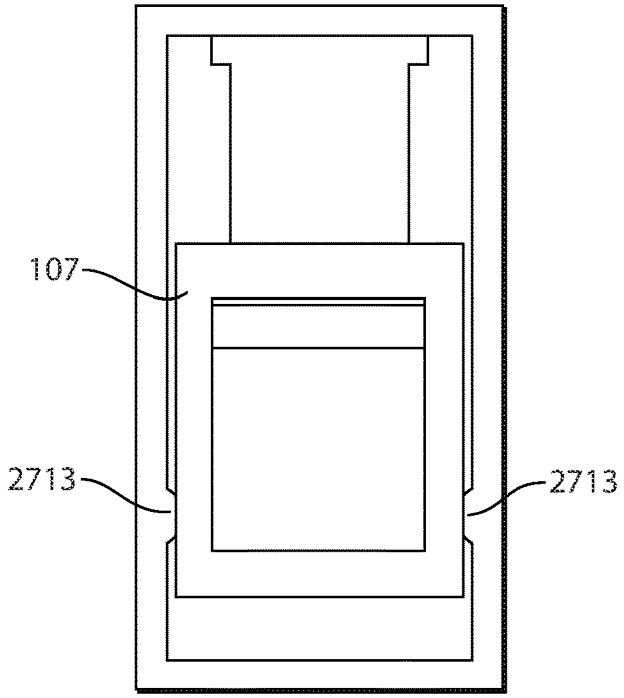
FIG. 27 illustrates a side view schematic diagram (orthogonal to the front view of FIG. 12) of an embodiment of a plurality of lug motion resistance features positioned in contact with a lower portion of the lug.
Figure 28:
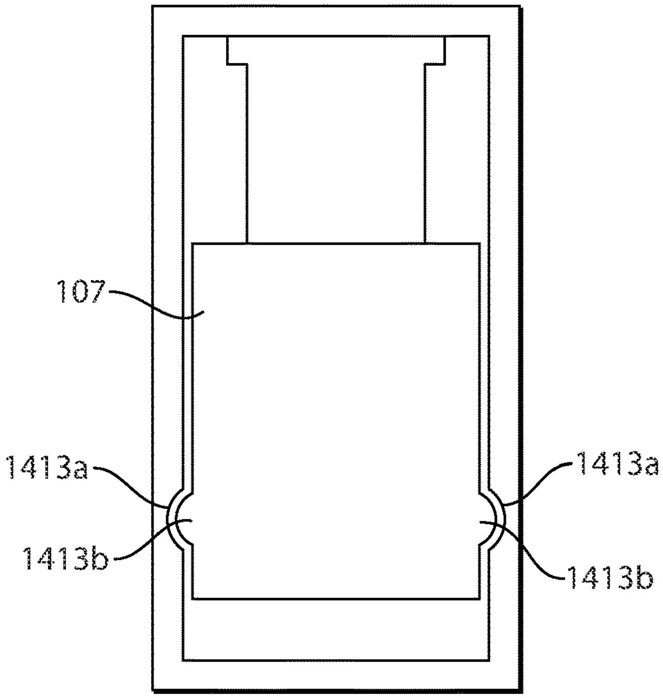
FIG. 28 illustrates a front view schematic diagram of an embodiment of a plurality of lug motion resistance features extending from a lower portion of a lug (e.g., into a recess on the housing)
Figure 29:
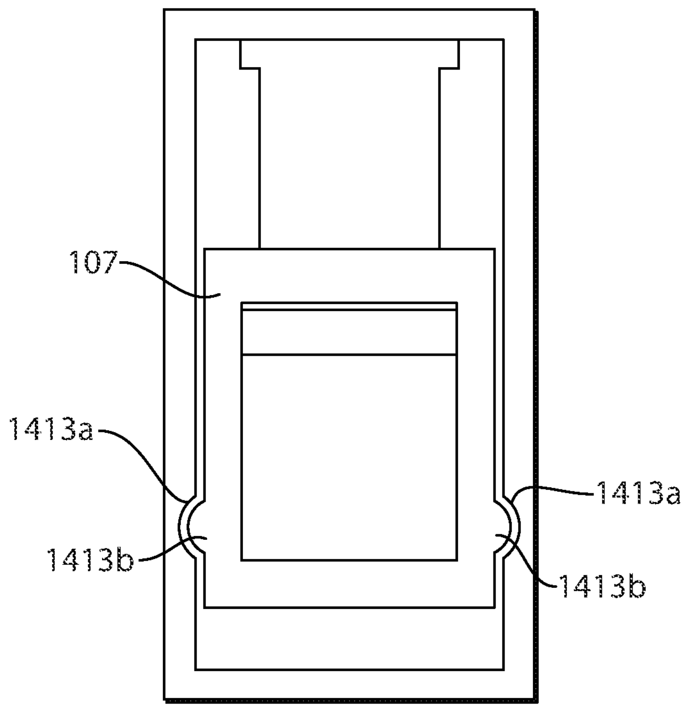
FIG. 29 illustrates a side view schematic diagram of an embodiment of a plurality of lug motion resistance features extending from a lower portion of a lug (e.g., into a recess on the housing)

FIG. 26 illustrates a front view schematic diagram of an embodiment of a plurality of lug motion resistance features (e.g., protrusions 2613) positioned to be within a lug opening 107*b*. FIG. 27 illustrates a side view schematic diagram (orthogonal to the front view of FIG. 12) of an embodiment of a plurality of lug motion resistance features (e.g., protrusions 2713). FIG. 28 illustrates a front view schematic diagram of an embodiment of a plurality of lug motion resistance features (e.g., protrusions 1413*b*) extending from a lower portion of a lug 107 (e.g., into a recess 1413*a* on the housing 101). FIG. 29 illustrates a side view schematic diagram of an embodiment of a plurality of lug motion resistance features (e.g., protrusions 1413*b*) extending from a lower portion of a lug 107 (e.g., into a recess 1413*a* on the housing 101). FIG. 30 illustrates a partial perspective view of an embodiment of a lug motion resistance feature comprising a breakable feature 1613 stored in a pocket 1614 and extending from a housing 101 on an orthogonal side (e.g., wall 105*d*) to that shown in FIG. 16.

Figure 31:
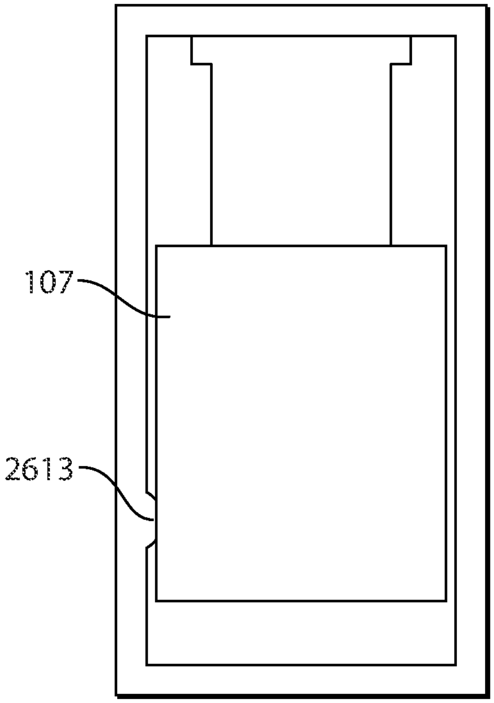
FIG. 31 illustrates a front view schematic diagram of an embodiment of a single lug motion resistance feature positioned to be within a lug opening.
Figure 32:
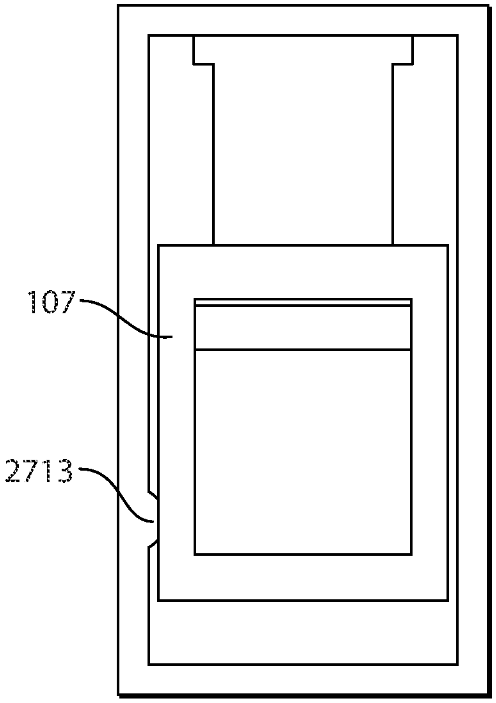
FIG. 32 illustrates a side view schematic diagram of an embodiment of a single lug motion resistance feature at a lower portion of the lug.
Figure 33:
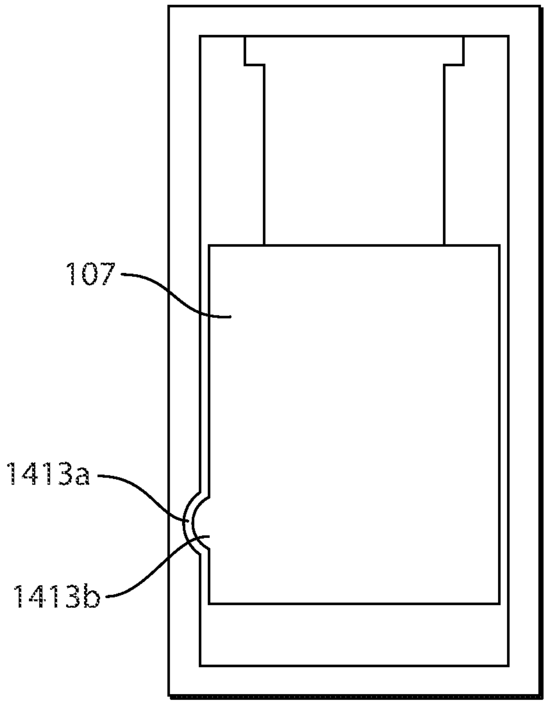
FIG. 33 illustrates a front view schematic diagram of an embodiment of a single lug motion resistance feature extending from a lower portion of a lug (e.g., into a recess on the housing)
Figure 34:
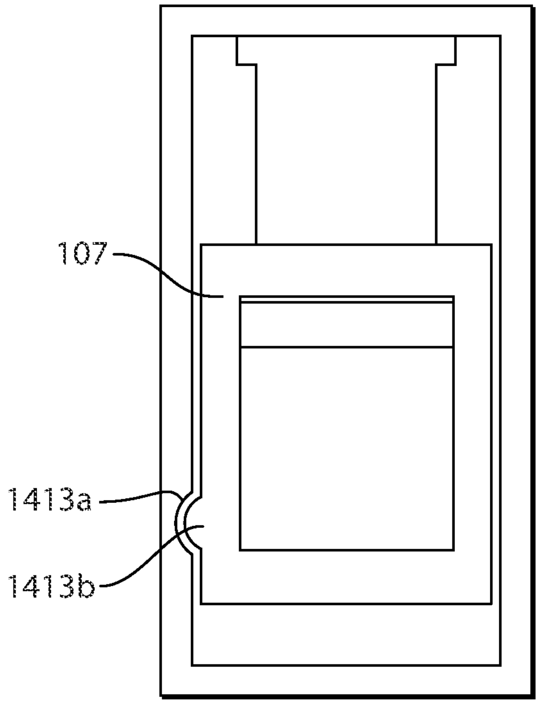
FIG. 34 illustrates a side view schematic diagram of an embodiment of a single lug motion resistance feature extending from a lower portion of a lug (e.g., into a recess on the housing)

FIG. 31 illustrates a front view schematic diagram of an embodiment of a single lug motion resistance feature (e.g., protrusion 2613) positioned within a lug opening 107*b*. FIG. 32 illustrates a side view schematic diagram of an embodiment of a single lug motion resistance feature (e.g., protrusion 2713) in contact with a lower portion of a lug 107. FIG. 33 illustrates a front view schematic diagram of an embodiment of a single lug motion resistance feature (e.g., protrusion 1413*b*) extending from a lower portion of a lug 107 (e.g., into a recess 1413*a* on the housing 101). FIG. 34 illustrates a side view schematic diagram of an embodiment of a single lug motion resistance feature (e.g., protrusion 1413*b*) extending from a lower portion of a lug 107 (e.g., into a recess 1413*a* on the housing 101).

FIG. 35 is a perspective view illustrating an embodiment of a lug motion resistance feature (e.g., protrusion 3513) having a partial length semi-cylindrical shape. FIG. 36 is a perspective view illustrating an embodiment of a lug motion resistance (e.g., protrusions 3613) feature having a plurality of sections of a partial length semi-cylindrical shape. FIG. 37 is a perspective view illustrating an embodiment of a lug motion resistance feature (e.g., protrusion 113) having a full length semi-cylindrical shape extending along an entire length of an inner wall (e.g., wall 105*b*) defining a lug channel 105.

Figure 38:
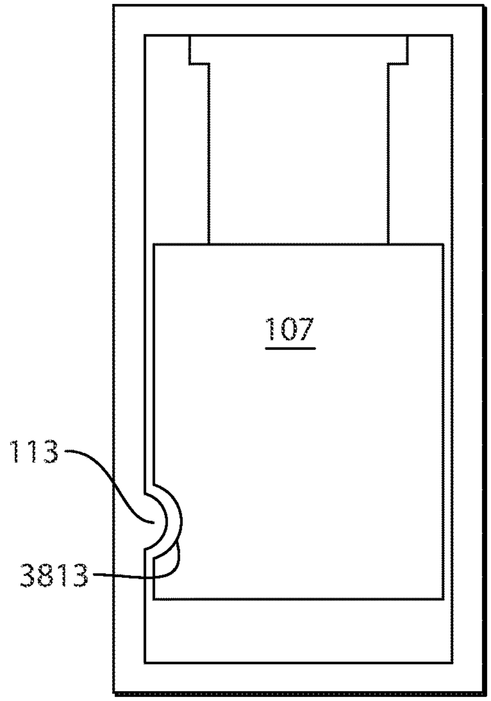
FIG. 38 illustrates a front view schematic diagram of an embodiment of a single lug motion resistance feature extending from a lower portion of the housing (e.g., into a recess on the lug)
Figure 39:
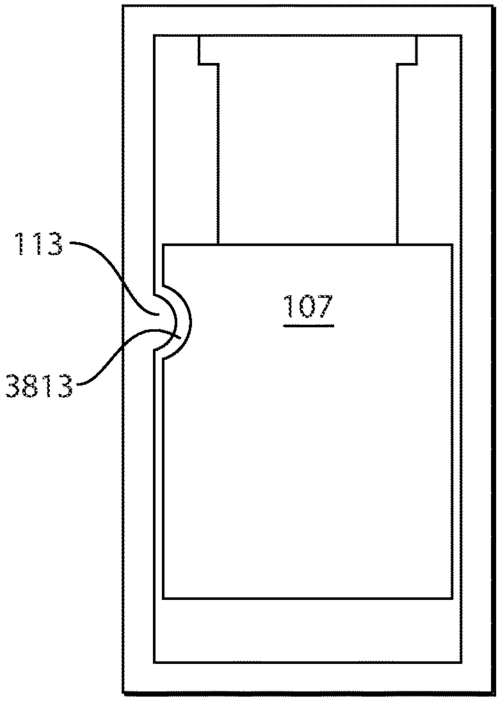
FIG. 39 illustrates a front view schematic diagram of an embodiment of a single lug motion resistance feature extending from an upper portion of the housing (e.g., into a recess on the lug)
Figure 40:
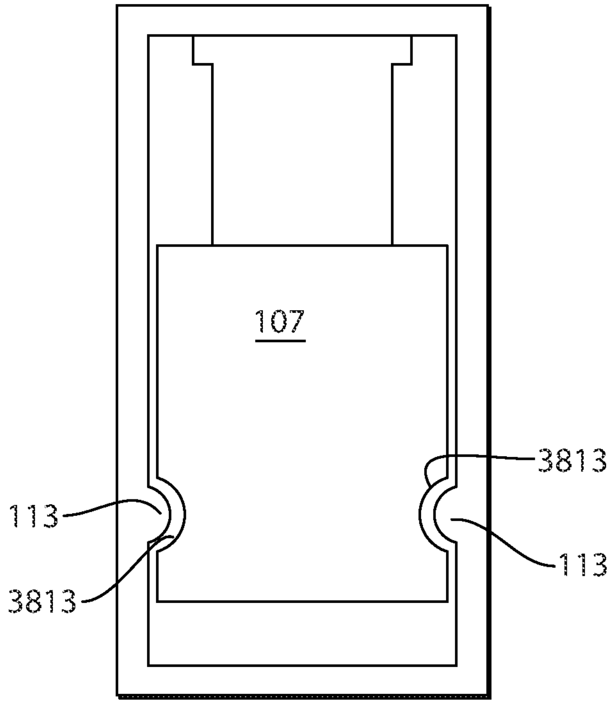
FIG. 40 illustrates a front view schematic diagram of an embodiment of a plurality of lug motion resistance features extending from a lower portion of the housing (e.g., into a recess on the lug)
Figure 41:
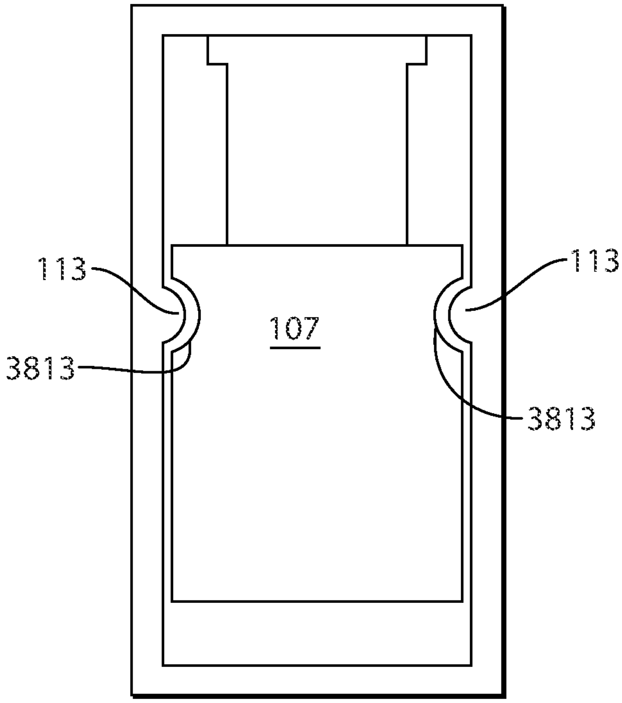
FIG. 41 illustrates a front view schematic diagram of an embodiment of a plurality of lug motion resistance features extending from an upper portion of the housing (e.g., into a recess on the lug)
Figure 42:
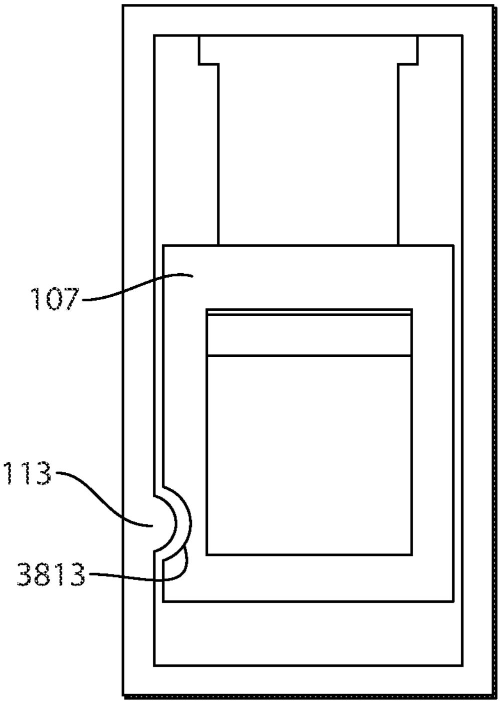
FIG. 42 illustrates a side view schematic diagram of an embodiment of a single lug motion resistance feature extending from a lower portion of the housing (e.g., into a recess on the lug)
Figure 43:
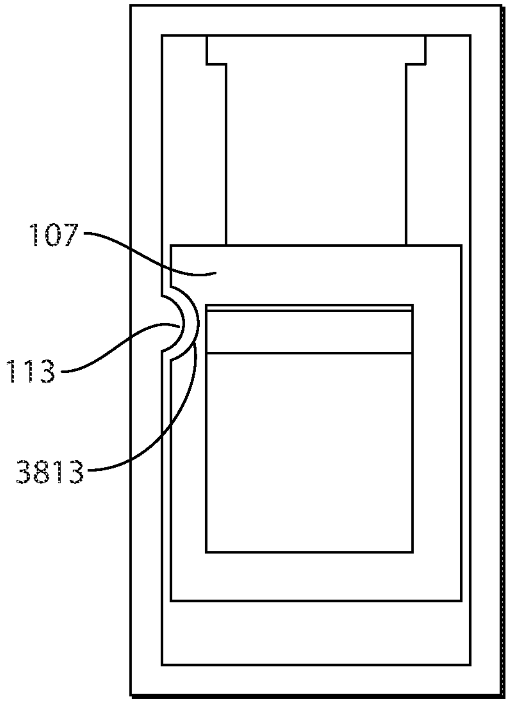
FIG. 43 illustrates a side view schematic diagram of an embodiment of a single lug motion resistance feature extending from an upper portion of the housing (e.g., into a recess on the lug)
Figure 44:
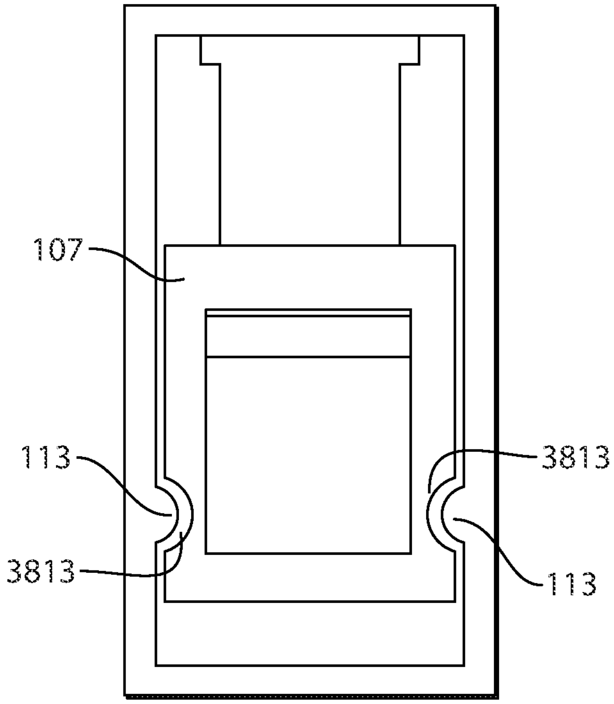
FIG. 44 illustrates a side view schematic diagram of an embodiment of a plurality of lug motion resistance features extending from a lower portion of the housing (e.g., into a recess on the lug)
Figure 45:
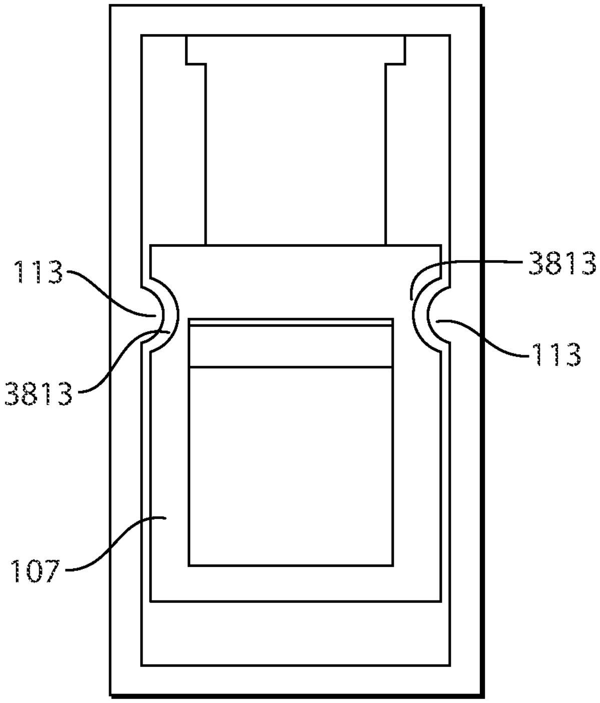
FIG. 45 illustrates a side view schematic diagram of an embodiment of a plurality of lug motion resistance features extending from an upper portion of the housing (e.g., into a recess on the lug).

FIG. 38 illustrates a front view schematic diagram of an embodiment of a single lug motion resistance feature (e.g., protrusion 113) extending from a lower portion of the housing (e.g., into a recess 3813 on the lug 107). FIG. 39 illustrates a front view schematic diagram of an embodiment of a single lug motion resistance feature (e.g., protrusion 113) extending from an upper portion of the housing (e.g., into a recess 3813 on the lug 107). FIG. 40 illustrates a front view schematic diagram of an embodiment of a plurality of lug motion resistance features (e.g., protrusions 113) extending from a lower portion of the housing (e.g., into a recess 3813 on the lug 107). FIG. 41 illustrates a front view schematic diagram of an embodiment of a plurality of lug motion resistance features (e.g., protrusions 113) extending from an upper portion of the housing (e.g., into a recess 3813 on the lug 107). FIG. 42 illustrates a side view schematic diagram of an embodiment of a single lug motion resistance feature (e.g., protrusion 113) extending from a lower portion of the housing (e.g., into a recess 3813 on the lug 107). FIG. 43 illustrates a side view schematic diagram of an embodiment of a single lug motion resistance feature (e.g., protrusion 113) extending from an upper portion of the housing (e.g., into a recess 3813 on the lug 107). FIG. 44 illustrates a side view schematic diagram of an embodiment of a plurality of lug motion resistance features (e.g., protrusions 113) extending from a lower portion of the housing (e.g., into a recess 3813 on the lug 107). FIG. 45 illustrates a side view schematic diagram of an embodiment of a plurality of lug motion resistance features (e.g., protrusions 113) extending from an upper portion of the housing (e.g., into a recess 3813 on the lug 107).

In certain embodiments, the one or more resistance features can include a mechanical resistance assembly. For example, a spring loaded plunger can extend partly into the lug channel 105 similar to the one or more protrusions 111 disclosed above. The plunger can be forced into a recess in the wall against the spring force. The spring force of the spring can be selected to provide a desired resistance. The plunger can include any suitable shape, e.g., any of those disclosed herein or otherwise.

Figure 8A:
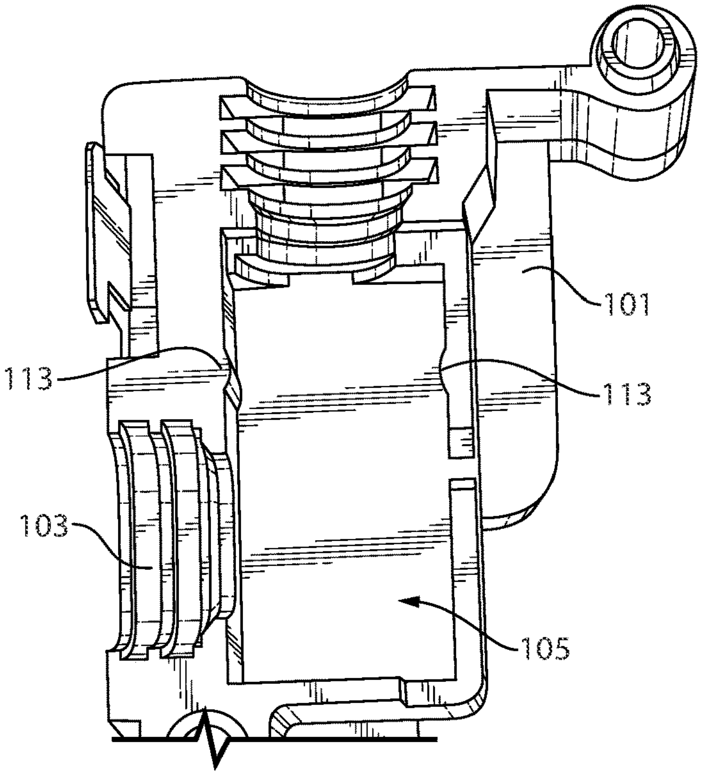
FIG. 8A is an elevation view of an embodiment of a housing portion of a housing of the embodiment of FIG. 1.
Figure 8B:
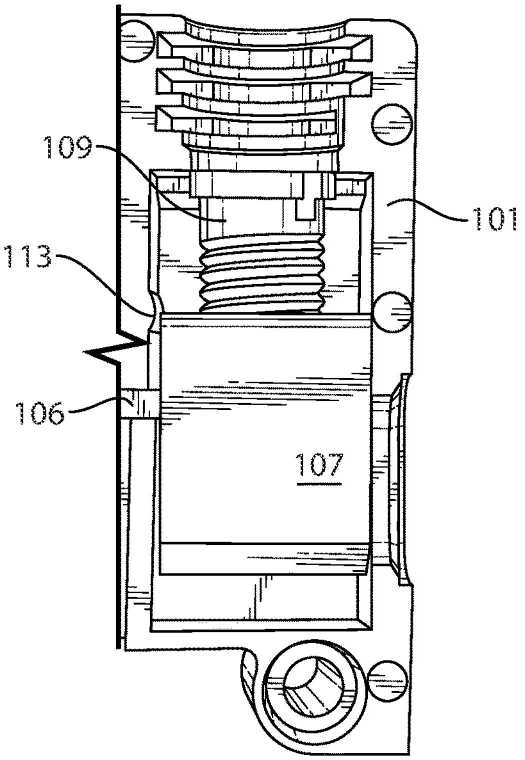
FIG. 8B is an elevation view of the housing portion of FIG. 8A, shown having a lug around a terminal, and an actuator disposed therein.
Figure 9:
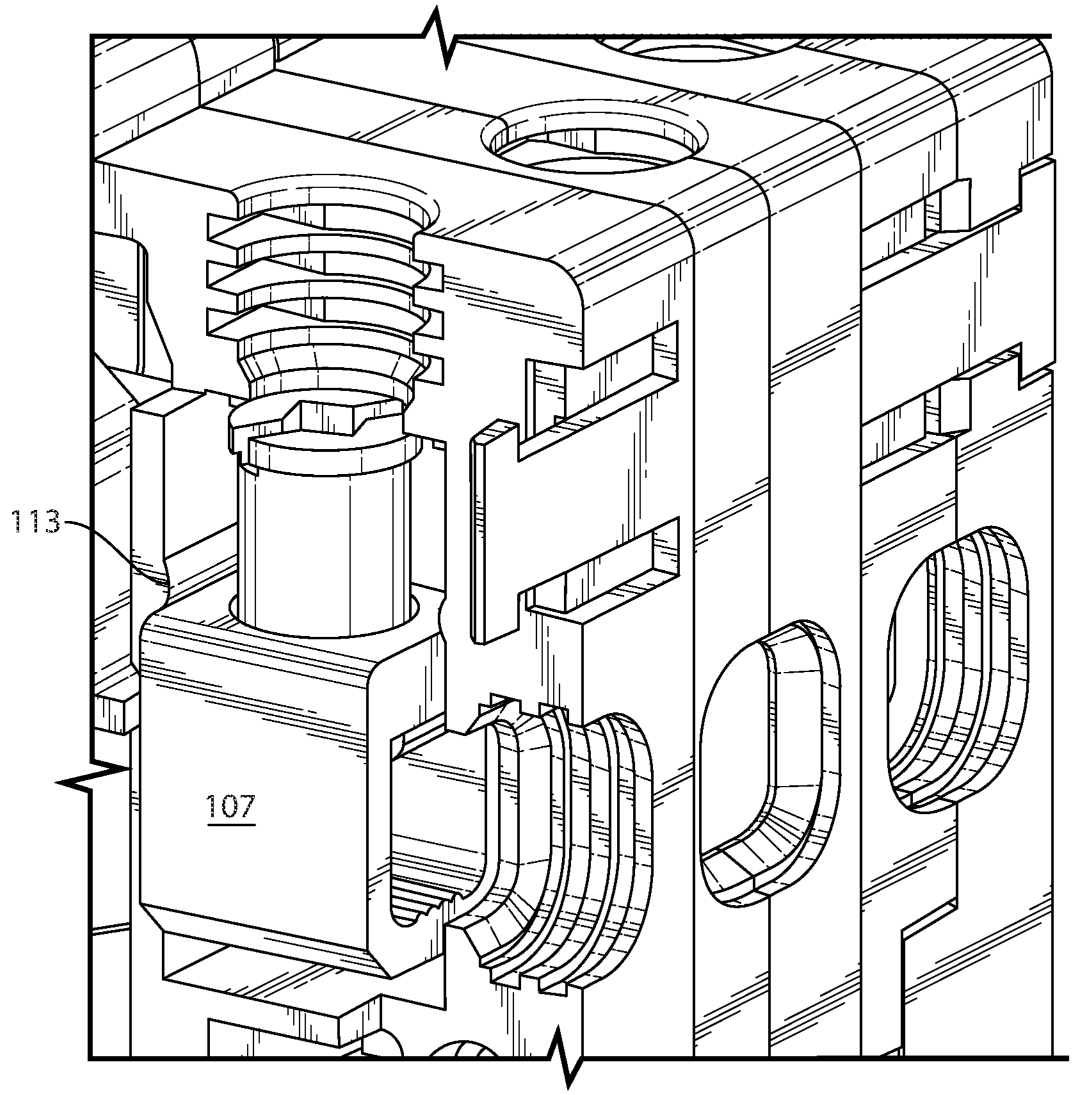
FIG. 9 is a perspective view of the embodiment as shown in FIG. 4, showing a lug in an open position.

In accordance with at least one aspect of this disclosure, e.g., as shown partially in FIG. 8A, a housing 101 for a circuit breaker (e.g., as shown in FIG. 1) can include a connection opening 103 configured to receive a conductor (e.g., a wire), a lug channel 105 in communication with the connection opening 103 and configured to receive a lug (e.g., lug 107) to allow the lug 107 to move between an open position and a closed position. The housing 101 can include one or more protrusions 113 configured to resist motion of the lug 107 toward the closed position to retain the lug 107 in the open position until actuated to overcome the one or more protrusions 113. The housing 101 can be any suitable housing 101 and include any suitable resistance feature(s) disclosed herein, e.g., as described above.

In accordance with at least one aspect of this disclosure, a circuit breaker (e.g., as shown in FIG. 1) can include a housing 101 having a connection opening 103 configured to receive a conductor (e.g., a wire), and a lug channel 105 in communication with the connection opening 103. The circuit breaker can include a terminal 106 extending into the lug channel 105 and a lug 107 disposed within the lug channel 105 and configured to be actuated between an open position relative to the terminal 106 and the connection opening 103, and a closed position relative to the terminal 106 and the connection opening 103. The lug 107 can define a lug opening 107*a*, and the terminal 106 can be positioned within the lug opening 107. The circuit breaker can include an actuator 109 connected to the lug 107 and configured to actuate the lug 107 between the open position wherein the conductor is insertable through the connection opening 103 into the lug opening 107*a* to be between the lug 107 and the terminal 106, and the closed position wherein the conductor is clamped between the terminal 106 and the lug 107 within the lug opening 107*a*. The actuator 109 can be a threaded screw held axially captive between the housing 101 and configured to rotate relative to the housing 101. The lug 107 can be meshed with the threaded screw to slide axially within the lug channel 105 as a function of rotation of the threaded screw. The circuit breaker can include one or more lug motion resistance features 111 extending from the housing 101 and/or the lug 107. The one or more lug motion resistance features 111 can be configured to resist motion of the lug 107 toward the closed position to retain the lug 107 in the open position (e.g., until actuated to overcome the one or more lug motion resistance features 111). The one or more lug motion resistance features 111 can include any suitable resistance features disclosed herein, e.g., described above.

Embodiments can provide a feature to block movement of a lug (e.g., in a circuit breaker) from an open position until sufficient torque applied to screw to pull lug past or through the feature. Embodiments can include protrusions in the housing that are integral or attached, and/or are mechanical, bendable, deformable or breakable. Protrusions can be made of the same material as the housing and/or a different material. Embodiments can have protrusions made to break off when intentionally torqued to allow a lug to be moved up. Embodiments can include protrusions on any and/or all sides of the lug channel, and that have any suitable shape(s).

The torque to overcome the resistance features can be set to be less than total torque usually required to compress a conductor within the lug to the terminal (e.g., defined by the manufacturer or code), and can be something greater than force induced by vibration due to shipping and handling. For example, in certain embodiments, protrusions can require up to about 25% of total expected torque to overcome.

Embodiments can include one-time (or limited-count use) features that break away or are shaved away (which is function of size and/or shape) to determine how many uses it gets. Embodiments can include protrusions that are sized to fit within the lug channel of lug to be out of the way once the lug moved past the protrusion.

Embodiment can include a single use (or no-interference-after-moving-past) protrusion which can be beneficial because the resistance effect of protrusion can be negated once moved past and the original torque specifications can be the same. Embodiments can include any suitable type of protrusions, e.g., deformable, shavable, leaf spring that can deflect, mechanical spring loaded assembly, or plastic breakable features (e.g., stored in a pocket). Embodiments can be positioned on a top of the lug, or bottom of the lug, on the housing (on any suitable side(s), e.g., same as the connection opening and/or orthogonal thereto and/or parallel therewith), through all of the lug channel, partially through the lug channel, semi-cylindrical shape, organic shape, drafted or not, on both sides of the lug channel or single sided, etc.

Embodiments can include a feature in a circuit breaker case surrounding a box style lug that prevents the lug from vibrating closed during shipping and handling of product. A small amount of torque can be required to be applied to the lug screw for the lug body to move past this feature. This torque can be enough to prevent the lug from vibrating to the closed position but insignificant enough to interfere with lug performance.

Users prefer lugs to be in the fully open position to improve efficiency for wire installation to a circuit breaker, for example. Currently, there are two ways to position the lugs in miniature circuit breakers prior to shipment. The first is with lugs in the fully closed position in order to prevent lug movement during shipment. The second is to position the lugs in the fully open but susceptible to vibrating closed during shipment. If the lug is not fully open, it may require the customer to back out the lug screw prior to wire installation. Embodiments eliminate this step from the wire installation process and improve efficiency.

Embodiments provide a solution to have the lugs of a circuit breaker stay in the open position during shipping. Embodiments can guarantee that the end user will always receive the lug in the open position, installation ready. This can save time for users, and for manufacturing.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A circuit breaker, comprising:

a housing, comprising:

a connection opening configured to receive a conductor; and a lug channel in communication with the connection opening;

a terminal extending into the lug channel;

a lug disposed within the lug channel and configured to be actuated between an open position relative to the terminal and the connection opening and a closed position relative to the terminal and the connection opening, wherein the lug defines a lug opening that extends into to the lug, wherein the terminal is positioned within the lug opening;

an actuator connected to the lug and configured to actuate the lug between the open position wherein the conductor is insertable through the connection opening into the lug opening to be between the lug and the terminal, and the closed position wherein the conductor is clamped between the terminal and the lug within the lug opening, wherein the actuator is a threaded screw held axially captive between the housing and configured to rotate relative to the housing, wherein the lug is meshed with the threaded screw to slide axially within the lug channel as a function of rotation of the threaded screw; and one or more lug motion resistance features extending from at least one of the housing and the lug, wherein the one or more lug motion resistance features are configured to resist motion of the lug toward the closed position to retain the lug in the open position, wherein the one or more lug motion resistance features is/are positioned to engage the lug channel and the lug to one another at a top portion of the lug in the open position, wherein the top portion of the lug is defined where the actuator engages the lug.

2. The circuit breaker of claim 1, wherein the one or more lug motion resistance features includes one or more protrusions extending from the housing within the lug channel.

3. The circuit breaker of claim 2, wherein the one or more protrusions are integral with the housing.

4. The circuit breaker of claim 2, wherein the one or more protrusions are made of a softer material than the lug such that the lug is configured to deform or destroy at least a portion of the one or more protrusions to overcome the one or more protrusions when actuated toward the open position.

5. The circuit breaker of claim 1, wherein the one or more lug motion resistance features are configured to be overcome by the lug being actuated by the actuator with a desired amount of force.

6. An electrical connector assembly, comprising:

a housing, comprising:

a connection opening configured to receive a conductor; and a lug channel in communication with the connection opening;

a terminal extending into the lug channel;

a lug disposed within the lug channel and configured to be actuated between an open position relative to the terminal and the connection opening and a closed position relative to the terminal and the connection opening, wherein the lug defines a lug opening extending into the lug with a bottom inner surface spaced apart from the terminal in the open position and more proximal to the terminal in the closed position, configured to engage a conductor received through the connection opening between the terminal and the bottom inner surface in the closed position, wherein the terminal is positioned within the lug opening such that the terminal and lug channel remain stationary relative to one another regardless of whether the lug is in the open position or closed position;

an actuator at an upper end of the lug channel, connected to the lug and configured to actuate the lug between the open position and the closed position, wherein a top portion of the lug where the actuator engages the lug is between the inner bottom surface of the lug and the upper end of the lug channel; and one or more lug motion resistance features extending from at least one of the housing and the lug inside the lug channel, wherein the one or more lug motion resistance features is/are positioned to engage the lug channel and the lug to one another at the top portion of the lug in the open position, wherein the one or more lug motion resistance features are configured to resist motion of the lug toward the closed position to retain the lug in the open position until actuated.

7. The assembly of claim 6, wherein the one or more lug motion resistance features includes one or more protrusions extending from the housing within the lug channel.

8. The assembly of claim 7, wherein the one or more protrusions are integral with the housing.

9. The assembly of claim 7, wherein the one or more protrusions are made of a softer material than the lug such that the lug is configured to deform or destroy at least a portion of the one or more protrusions to overcome the one or more protrusions when actuated toward the open position.

10. The assembly of claim 9, wherein the one or more protrusions are configured such that a force required to overcome the one or more protrusions is higher than a force imparted through vibration of the assembly.

11. The assembly of claim 10, wherein the one or more protrusions include a semi-circular cross-section or a semi-spherical shape.

12. The assembly of claim 7, wherein the one or more protrusions are sized to fit within a lug opening of the lug after a portion of the lug has moved beyond the one or more protrusions.

13. The assembly of claim 7, wherein the one or more protrusions include a breakable component configured to fracture off of a wall defining the lug channel.

14. The assembly of claim 7, wherein the one or more protrusions extend along a complete length of the lug channel in a direction orthogonal to an axis of motion of the lug.

15. The assembly of claim 7, wherein the one or more protrusions extend only partly across the lug channel in a direction orthogonal to an axis of motion of the lug.

16. The assembly of claim 7, wherein the one or more protrusions include a top protrusion positioned between the lug and an end of the lug channel toward the closed position.

17. The assembly of claim 6, wherein the one or more resistance features includes at least two resistance features positioned at opposite sides of the lug channel relative to each other.

18. The assembly of claim 6, wherein the one or more resistance features are a single resistance feature.

19. The assembly of claim 6, wherein the actuator is a threaded screw held axially captive between the housing and configured to rotate relative to the housing, wherein the lug is meshed with the threaded screw to slide axially within the lug channel as a function of rotation of the threaded screw.

20. The assembly of claim 6, wherein the one or more lug motion resistance features are configured to be overcome by the lug being actuated by the actuator with a desired amount of force.

* * * * *